(12) United States Patent
Strong et al.

(10) Patent No.: US 7,096,799 B2
(45) Date of Patent: Aug. 29, 2006

(54) PORTABLE FOLDING TABLE

(75) Inventors: L. Curtis Strong, Clearfield, UT (US); Jacob Kearl, Plain City, UT (US); Thayne B. Haney, Syracuse, UT (US); Ray Adams, Logan, UT (US); Ed VanNimwegen, North Ogden, UT (US); David C. Winter, Layton, UT (US)

(73) Assignee: Lifetime Products, Inc., Clearfield, UT (US)

( * ) Notice: Subject to any disclaimer, the term of this patent is extended or adjusted under 35 U.S.C. 154(b) by 250 days.

(21) Appl. No.: 10/408,914

(22) Filed: Apr. 8, 2003

(65) Prior Publication Data

US 2003/0230219 A1  Dec. 18, 2003

Related U.S. Application Data

(60) Provisional application No. 60/371,486, filed on Apr. 9, 2002.

(51) Int. Cl.
*A47B 3/00* (2006.01)

(52) U.S. Cl. .................................. 108/132; 108/129

(58) Field of Classification Search ............. 108/166, 108/167, 168, 169, 170, 125, 132, 129, 131
See application file for complete search history.

(56) References Cited

U.S. PATENT DOCUMENTS

| | | |
|---|---|---|
| 643,511 A | 2/1900 | Lloyd |
| 1,614,187 A | 1/1927 | Coggins |
| 1,765,766 A | 6/1930 | Lyon |
| 1,976,140 A | 10/1934 | Paul |
| 2,542,394 A | 2/1951 | Cohen et al. |
| 2,619,394 A | 11/1952 | Mahr |
| 2,730,418 A | 1/1956 | Blink |
| 2,747,957 A | 5/1956 | Lencioni |
| 2,871,076 A | 1/1959 | Mell |
| 2,872,259 A | 2/1959 | Thorpe |
| 3,143,982 A | 8/1964 | Blink et al. |
| 3,368,504 A | 2/1968 | Cohen |
| 3,656,439 A | 4/1972 | Domin |
| 3,866,913 A | 2/1975 | Zimmers et al. |
| 4,005,898 A | 2/1977 | Way |
| D247,080 S | 1/1978 | Robinson |
| 4,089,522 A | 5/1978 | Rock |
| 4,133,271 A | 1/1979 | Carlson |

(Continued)

*Primary Examiner*—Jose V. Chen
(74) *Attorney, Agent, or Firm*—Workman Nydegger

(57) ABSTRACT

A table that includes a table top with a first half which is pivotally connected to a second half. The first and second halves of the table top are movable between a first position in which the halves are generally aligned and a second position in which the halves are generally placed adjacent to each other. The first and second halves of the table top are preferably constructed from blow-molded plastic and each of the halves desirably have a generally hollow interior. The first and second halves of the table top may include interlocking portions that are interconnected when the halves are in the aligned position. Desirably, the interlocking portions have generally hollow interiors that are integrally formed with the generally hollow interiors of the halves of the table top during the blow-molding process. The table top may also include one or more overlapping portions that are interconnected when the halves of the table top are in the aligned position. The overlapping portions may also have generally hollow interiors that are integrally formed with the generally hollow interiors of the halves of the table top during the blow-molding process.

20 Claims, 16 Drawing Sheets

U.S. PATENT DOCUMENTS

| | | |
|---|---|---|
| 4,489,661 A | 12/1984 | Fitzgerald |
| 4,653,804 A | 3/1987 | Yoo et al. |
| 4,841,877 A | 6/1989 | Virtue |
| 4,883,314 A | 11/1989 | Sakong |
| 4,911,085 A | 3/1990 | Pencoske |
| 5,009,170 A | 4/1991 | Spehar |
| 5,154,441 A | 10/1992 | White et al. |
| 5,357,872 A | 10/1994 | Wilmore |
| 5,377,601 A | 1/1995 | Cashen |
| 5,381,740 A * | 1/1995 | Johnston ............... 108/167 |
| 5,421,272 A | 6/1995 | Wilmore |
| 5,501,157 A | 3/1996 | Westerburgen |
| 5,730,066 A * | 3/1998 | Auten et al. ............. 108/44 |
| D414,626 S | 10/1999 | Collins et al. |
| 5,983,807 A | 11/1999 | Tarnay et al. |
| 6,000,345 A | 12/1999 | Gillotti |
| D420,527 S | 2/2000 | Pinch et al. |
| 6,032,585 A | 3/2000 | Pinch |
| 6,058,853 A | 5/2000 | Pinch |
| 6,112,674 A | 9/2000 | Stanford |
| 6,334,400 B1 * | 1/2002 | Nien ....................... 108/115 |
| 6,454,357 B1 | 9/2002 | Foulger |
| D468,135 S | 1/2003 | Ashby et al. |
| D479,778 S | 9/2003 | Haney et al. |
| 6,684,426 B1 * | 2/2004 | Lin et al. ................. 108/132 |
| 6,752,091 B1 * | 6/2004 | Glover et al. ............ 108/168 |
| 6,905,166 B1 * | 6/2005 | Zhurong et al. ......... 108/132 |
| 2002/0092445 A1 | 7/2002 | Glover et al. |

* cited by examiner

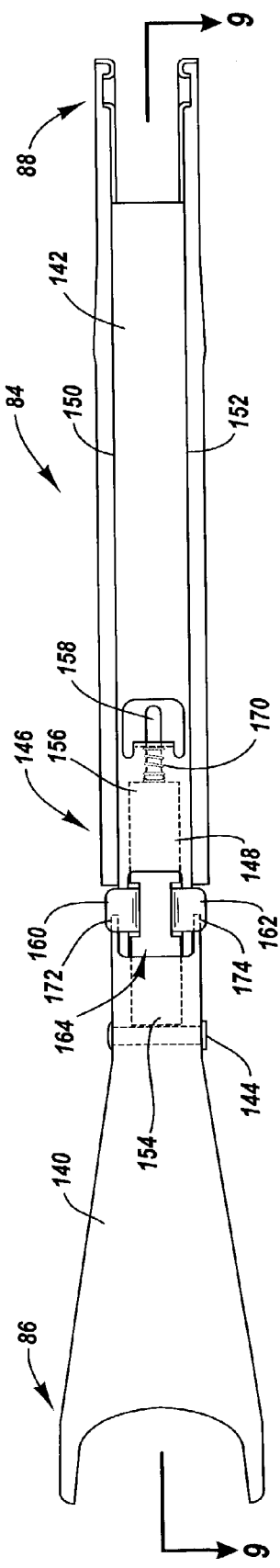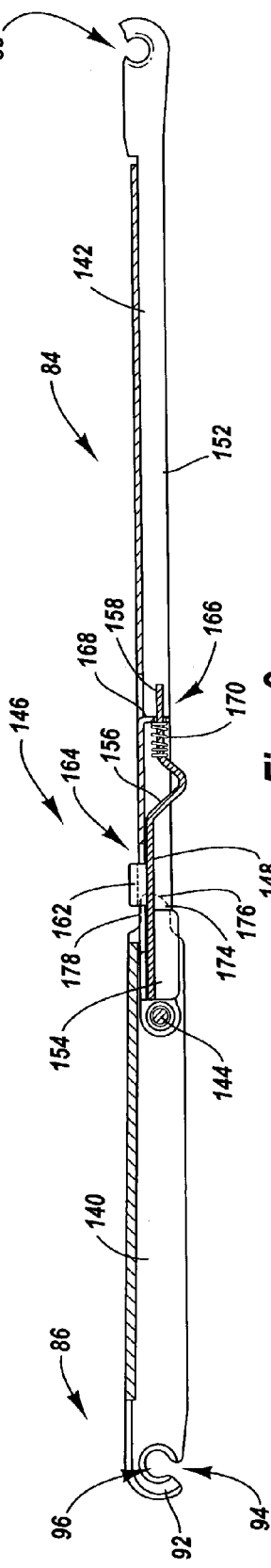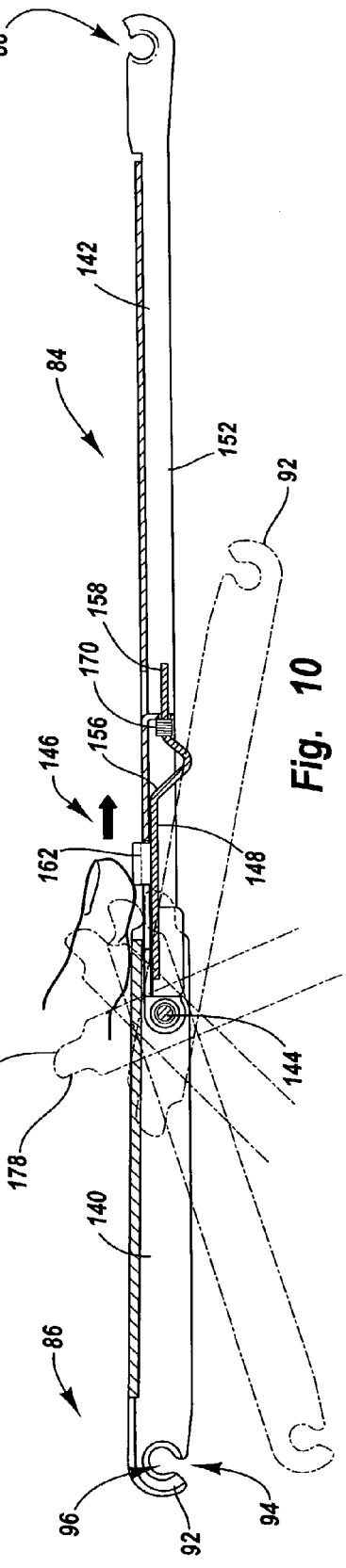

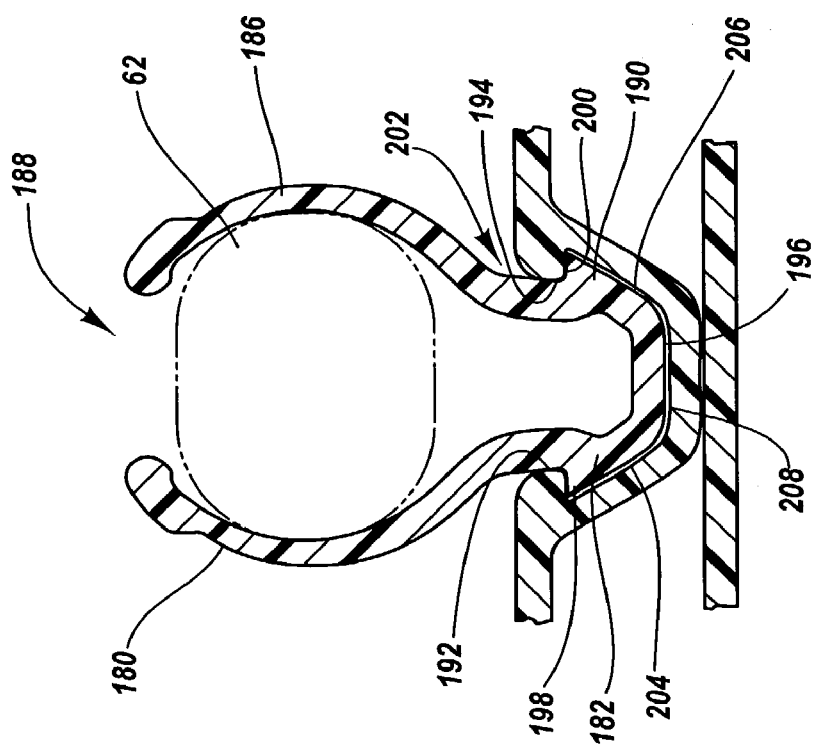
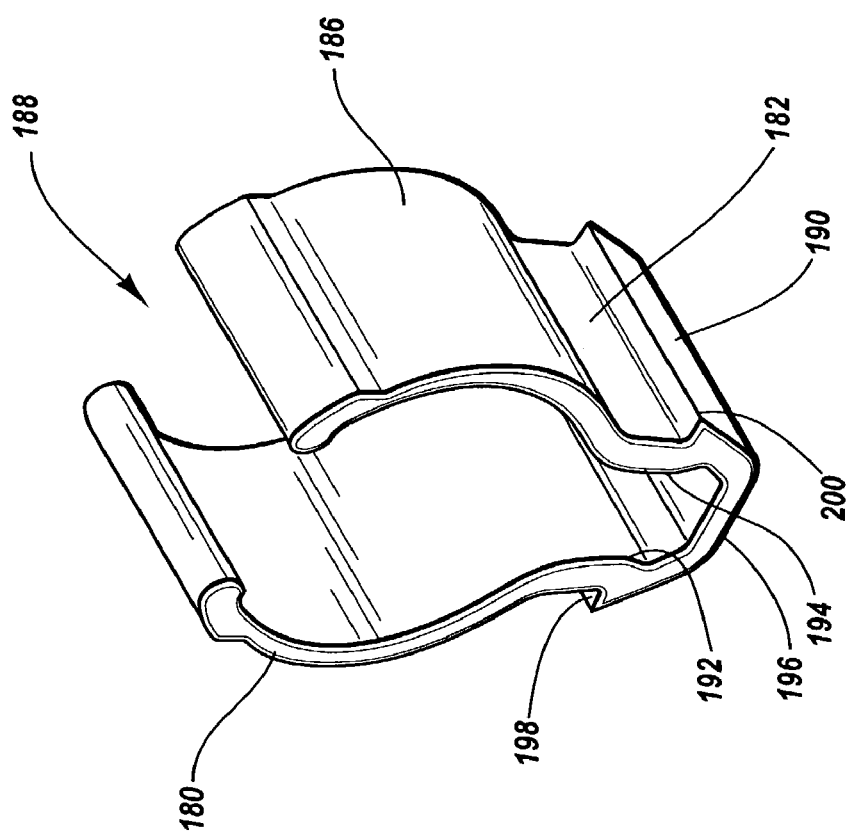

PORTABLE FOLDING TABLE

CROSS-REFERENCE TO RELATED APPLICATIONS

The present application claims priority to and the benefit of U.S. Provisional Patent Application Ser. No. 60/371,486, entitled UTILITY TABLE WITH BLOW-MOLDED TABLE TOP, which was filed on Apr. 9, 2002, and is hereby incorporated by reference in its entirety.

BACKGROUND OF THE INVENTION

1. Field of the Invention

The present invention is generally related to tables and, in particular, to tables with blow-molded plastic table tops.

2. Description of Related Art

Many different types of tables are well known and used for a variety of different purposes. For example, conventional tables may include legs that are pivotally attached to the table top and the legs may be movable between a use position in which the legs extend outwardly from the table top and a storage position in which the legs are folded against the table top. Large, portable tables with folding legs are often referred to as "banquet tables" and these tables are often used in assembly halls, banquet halls, convention centers, hotels, schools, churches, and other locations where large groups of people meet. Because the tables are portable, the tables can be positioned in an assortment of different configurations and used in a variety of settings. When the tables are no longer needed, the tables can be moved or stored.

Banquet tables are often used by various organizations and groups because they allow effective and efficient use of space. For example, banquet tables may be used in large multi-purpose areas such as school gymnasiums, meeting halls and hotel conference rooms to allow groups of people to meet. After the meetings are completed, the tables can be folded into a storage position and stowed in a relatively small space. This allows the gymnasiums, meeting halls and conference rooms to be used for other purposes. Thus, banquet tables allow groups and organizations to efficiently use a particular space.

Conventional banquet tables with legs that are foldable between a use position and a storage position may also be used in a variety of other locations. For example, these known tables may provide immediate table space and/or workspace in a house, apartment, garage, tool shed, and the like. The foldable legs allow the tables to be conveniently set up, taken down, stored and transported whenever and wherever the user chooses.

It is known to construct conventional banquet tables from relatively heavy materials such as wood or metal, which makes the tables heavy and difficult to move. In particular, the table tops of conventional banquet tables are often made from fiber board, particle board, or plywood, and these known table tops may include a plastic or Formica-type surface laminated onto the upper surface of the table top to create a working surface. Disadvantageously, many of these conventional banquet tables are not very strong and are unable to support a desired amount of weight. In order to increase the strength of these tables, thicker and heavier table tops are often used. Unfortunately, the thicker and heavier table tops further increase the weight of the tables. As a result, many conventional banquet tables with wooden table tops are undesirably heavy, and two or more people are often required to move the tables.

In order to prevent the middle portion of conventional banquet tables from sagging, it is known to attach a metal frame to the bottom surface of the wooden table top. These known metal frames often included two side rails that extended along the longitudinal length of the table top and the metal frames are frequently attached to the table top by a plurality of screws. Disadvantageously, the structural integrity of the table top may be decreased by the holes created by the plurality of screws, and this may allow the table to collapse and fail. In addition, because the screws are typically individually attached to the table top, that may significantly increase the amount of the time required to construct the table.

Conventional banquet tables are often six or eight feet in length and two or three feet in width. Thus, banquet tables are often difficult to move because of their large size and inherent bulkiness. In addition, as discussed above, these conventional banquet tables are often heavy. Accordingly, if these unwieldy and heavy conventional tables are inadvertently dropped, tipped over, or mishandled while moving or using the tables, then injury could result.

It is known to construct banquet tables from plastic or other lightweight materials in an attempt to decrease the weight of the tables. Many of these lighter-weight tables, however, lack the strength and sturdiness of the heavier-weight tables. Thus, many lighter-weight tables require complex support mechanisms and one or more support braces to increase the strength and sturdiness of the table, which undesirably increases the weight and complexity of the tables.

Conventional banquet tables generally include legs that are attached to the table tops by a number of mechanical fasteners such as screws or bolts, whether the table tops are constructed from wood, plastic or metal. Disadvantageously, attaching the legs to the table tops by screws or bolts creates a number of holes in the table tops. As discussed above, these holes may decrease the structural integrity of the table top and may create undesirable stress concentrations in the table top. The holes may also create weakness or failure points that allow the table to give way and collapse. It is also known to bond the table legs to the table top by adhesives such as glue, epoxy resins or other suitable types of bonding agents. The bonding of the legs to the table top, however, may decrease the structural integrity of the table top. Significantly, if the mechanical fasteners or adhesive connection of the legs to the table top fails, then the table may collapse. These conventional tables may be difficult to fix or repair, especially if the leg attachment portion of the table top is damaged or pulled away from the remaining portion of the table top.

The use of mechanical fasteners to attach the legs to the table top undesirably increases the number of parts required to construct the table, which may increase the time required to assemble the table. In addition, many conventional tables required the legs to be positioned against the underside of the table top and then attached to the table top by the mechanical fasteners or glue. This increases the difficulty of the manufacturing process because the legs and table top must first be held in the desired positions and then the legs must be fastened to the table top. In particular, if mechanical fasteners are used to attach the legs to the table top, mating surfaces such as holes in the legs and corresponding threaded openings in the table top must be carefully aligned before the legs can be attached to the table top. Accordingly, many conventional tables require one or more persons to hold the legs and table top in the desired locations, and another person to fasten the legs to the table top. This process is undesirably time consuming and labor intensive. Alternatively, a single person may be used to attach the legs to the table top, but this process is difficult to perform rapidly and without any errors.

It is also known to use complex attachment mechanisms to facilitate attachment of the legs to the table tops. Disadvantageously, these complex attachment mechanisms are generally heavier, more difficult to install, and more expensive. In addition, these complex attachment mechanisms are often more difficult to use than conventional mechanical fasteners or adhesives.

These disadvantages are often compounded because conventional tables with folding legs typically require separate and distinct attachment mechanisms for attaching each leg or a pair of legs to the table top. That is, because most conventional banquet tables include a leg or a pair of legs attached to each end of the table, a number of holes or attachment points are required to attach the legs to the table top. Accordingly, many conventional tables have two or four separate points of attachment in order to attach the table legs to the table top. Thus, conventional banquet tables often include a plurality of holes in each end of the table top, and these holes may undesirably allow the table to fail.

BRIEF SUMMARY OF THE INVENTION

A need therefore exists for a table that eliminates the above-described disadvantages and problems.

One aspect of the invention is a table including a table top and legs that are movable between a first position in which the legs extend away from the table top to allow the table to be used and a second position in which the legs are positioned near the table top for storage. Advantageously, the table top and legs create a strong, sturdy and secure table that can be used to support a wide variety of objects and the table can be used for many different purposes.

Another aspect is the table top is preferably constructed from blow-molded plastic to allow a lightweight table to be constructed. Significantly, if the table top is constructed from blow-molded plastic, it can easily be formed into any desired configuration, shape, size and design depending, for example, upon the intended use and/or configuration of the table. The blow-molded table top is also generally weather resistant and temperature insensitive, which allows the table to be used in a wide variety of locations and environments. In addition, the blow-molded table top is durable, long-lasting, and it generally does not corrode, rust or otherwise deteriorate over time. Further, because the blow-molded table top is relatively strong, it can be used to support a relatively large amount of weight. Significantly, the blow-molded table top may form a structural member of the table, or the table top may be supported by a frame.

Advantageously, the blow-molded plastic table top is relatively strong because it includes two or more opposing walls or surfaces that are separated by a given distance. The opposing walls help create a high-strength, rigid table top. In addition, because the interior portion of the table top is generally hollow, that creates a lightweight table top. Thus, the blow-molded table top is both lightweight and strong.

Still another aspect of the table is the table top may include one or more depressions, "tack-offs" or "kiss-offs." The depressions, which extend from one surface towards another surface, are desirably sized and configured to increase the strength and/or rigidity of the table top. Preferably, the depressions extend from one surface and contact or engage an opposing surface, but the depressions do not have to contact or engage another surface. The depressions are desirably formed in the bottom surface of the table top so that the depressions are generally not visible. The depressions, however, may be formed in the top surface and/or any other suitable portions of the table top. For example, one or more depressions may be formed in the top surface of the table top and one or more depressions may be formed in the bottom surface of the table top, and these opposing depressions may be generally aligned. At least a portion of these opposing depressions may contact or engage each other, but the opposing depressions do not have to touch or engage.

Significantly, the blow-molded table top can be quickly and easily constructed. Advantageously, the blow-molding process allows the opposing walls, depressions and other desired features to be quickly and easily formed in the table top. In addition, the blow-molded table top can be constructed as an integral, one-piece structure to help create a strong and rigid table top, but the table top could also be constructed from two or more pieces that are interconnected.

A further aspect of the table is the table top can be constructed with thin outer walls that decrease the amount of plastic required to construct the table top. As discussed above, the opposing walls and depressions allow a strong and sturdy table top to be constructed. These and other features also allow the table top to be constructed with relatively thin outer walls, which reduces the amount of plastic required to construct the table top. This may save manufacturing costs and reduce the amount of resources required to construct the table top. The thin outer walls may also allow the table top to be cooled more quickly during the manufacturing process, which may allow the table tops to be manufactured more quickly and efficiently.

Additionally, because the table top may be constructed from blow-molded plastic with thin outer walls, this allows a table with reduced weight to be constructed. Significantly, the lightweight table can be easily transported, which decreases shipping costs. Additionally, the consumer may appreciate the reduced weight because they can much more easily move and/or assemble the table.

Another aspect of the table is the blow-molded table top may include one or more features that are integrally formed in the table top as part of a unitary, one-piece structure. Advantageously, this may reduce the number of steps required in the manufacturing process, which may reduce the overall cost of the table. For example, the depressions may be integrally formed in the table top during the manufacturing process. In addition, one or more mounting portions may be integrally formed in the table top to allow the frame and/or legs to be attached to the table top. The mounting portions may also allow the frame and/or legs to be attached to the table top without the use of mechanical fasteners such as bolts or screws.

Yet another aspect of the table is the one or more depressions formed in the table top may be located in a predetermined pattern to increase the strength of the table top and/or decrease the amount of plastic used to construct the table top. Advantageously, if the depressions are placed near each other, then the table top may be constructed with thinner outer surfaces or walls and the strength of the table top may be increased. Desirably, the locations of the depressions do not vary significantly even when other features are integrally formed in the table top. Thus, for example, the depressions are preferably positioned in close proximity and in the same general pattern even around features such as attachment points, edges and other features of the table top. In addition, one or more depressions may be formed within the various features to maintain the generally consistent pattern of depressions. Significantly, the generally uniform pattern of depressions may allow a table top with homogeneous characteristics to be constructed.

A further aspect of the table is the legs can preferably be moved into a storage position to allow the table to be more easily transported or shipped. Desirably, the legs are at least partially disposed within recesses or channels to allow the height of the table in the storage position to be decreased. This may also allow the tables to be more easily stacked, shipped and transported. The legs may also have an oval or other non-circular configuration to further decrease the height of the table in the storage position.

Another aspect is the table may be easily assembled and/or disassembled because it does not include any heavy or complex mechanisms to attach the legs to the table top. In contrast, the table preferably includes a frame that can be attached to the table top by a snap, friction or interference fit. Specifically, the frame preferably includes two elongated side rails that are connected to frame mounting portions that are integrally formed in the table top. Significantly, no bolts, screws or other mechanical fasteners are required to attach the frame to the table top, but fasteners may be used if desired. Because mechanical fasteners are not required to attach the frame to the table top, fewer parts are required to assemble the table and no decrease in the structural integrity or strength of the table is created.

Still another aspect is the table can be manufactured quickly and easily. In particular, because the frame can be connected to the table top by a snap, friction or interference fit, no fasteners are required to attach the frame to the table top. This may allow the table to be assembled with less time than conventional tables. In addition, because the frame may be simply and easily connected to the table top, fewer workers may be required to assemble the table. Further, the straight forward design and attachment of the frame to the table top may allow the table to be shipped either assembled or unassembled, and it may allow retailers or consumers to assemble the table if desired.

A further aspect of the table is the legs may be attached to the frame. In particular, the side rails of the frame may include openings that are sized and configured to receive a cross member that allows the legs to pivot between a use position and a storage position relative to the table top. The openings preferably have a non-circular configuration and the cross member also has a non-circular cross-sectional configuration. In particular, the openings and the cross member may have oval, elliptical, oblong or egg-shaped configurations. The openings and cross member are preferably configured such that when the legs are positioned in the folded or stored position, the cross member is relatively loosely held within the openings in the frame. On the other hand, when the legs are in the extended or use position, the cross member is held tightly within the openings in the frame.

Another aspect of the table is the legs may be held in the folded or storage position by a retaining member or clip. The clip is preferably connected to the table top by a clip receiving portion that is integrally formed in the underside of the table top. The clip is preferably held within the clip receiving portion by a snap, friction or interference fit.

Still another aspect of the table is the legs can be held in the upright or extended position by a support brace. The support brace preferably includes a first end that is connected to the leg and a second end that is connected to a retaining member or bracket. The support brace is preferably connected to the leg and the bracket without the use of mechanical fasteners such as screws or rivets.

A further aspect of the invention is the support brace may include a locking mechanism that secures the support brace and the legs in an extended position. The locking mechanism preferably secures the legs in the extended position regardless of the position or orientation of the table. Thus, the legs will not move from the extended position to the collapsed position even if the table is turned on its side or placed upside-down.

Yet another aspect of the table is the bracket or retaining member is preferably attached to the table top by a snap, interference or friction fit. Desirably, the bracket is connected to the table top without requiring the use of any fasteners or adhesives, but fasteners or adhesives could be used if desired.

A further aspect is the table can be constructed without requiring the use of mechanical fasteners or tools. As discussed above, the frame, legs and retaining members can be secured to the table top without requiring the use of mechanical fasteners. In addition, the legs can be connected to the frame and the support braces without the use of mechanical fasteners. Thus, the table can be assembled without using mechanical fasteners such as screws, bolts, and rivets. Advantageously, this may decrease the cost of the table because fewer components are required to assemble the table. In addition, the table can be more quickly and easily assembled because it does not require the use tools to attach the various components. This may also allow the consumer or purchaser to more easily assemble the table.

Another aspect is the table top may include a downwardly extending lip and the inner surface of the lip may include a number of serrations, notches, ribs, and/or struts that are sized and configured to increase the strength, rigidity and/or flexibility of the lip. Advantageously, the uneven inner surfaces of the lip may increase the strength, rigidity and/or flexibility of the table top. In addition, the corners of the table top may also include one or more serrations, notches, ribs, and/or struts that are sized and configured to increase the strength, rigidity and/or flexibility of the corners.

A still further aspect of the table is the table top may be constructed from two or more pieces. The two or more pieces are preferably pivotally connected to allow, the table top to fold into a compact position. For example, the table top may be constructed from a first piece and a second piece with one or more interlocking portions and one or more overlapping portions. These interlocking and/or overlapping portions allow the two pieces of the table top to be securely interconnected to form a rigid table top. Significantly, the table top constructed from two or more pieces may allow the table to be more easily transported and/or stored because, for example, it may be folded in half.

Desirably, the table top may include a first portion and a second portion that are constructed from blow-molded plastic and include generally hollow interiors. The first portion of the table top is movable relative to the second portion between a first position in which the first portion and the second portion are generally aligned and a collapsed position in which the first portion is positioned near the second portion. A first interlocking portion may be connected to the first portion of the table top and a second interlocking portion connected to the second portion of the table top. The first interlocking portion and the second interlocking portion being interconnected when the first portion and the second portion are in the first position. In addition, the first interlocking portion may have a generally hollow interior that is integrally formed with the generally hollow interior of the first portion of the table top during the blow-molding process, and the second interlocking portion may have a generally hollow interior that is integrally formed with the generally hollow interior of the second portion of the table top during the blow-molding process.

The table top may also include a first overlapping portion that may be connected to the first portion of the table top and a second overlapping portion that may be connected to the second portion of the table top. The first overlapping portion and the second overlapping portion are interconnected when the first portion and the second portion are in the first position. The first overlapping portion may have a generally hollow interior that is integrally formed with the generally hollow interior of the first portion of the table top during the blow-molding process, and the second overlapping portion may have a generally hollow interior that is integrally formed with the generally hollow interior of the second portion of the table top during the blow-molding process.

These and other aspects, features and advantages of the present invention will become more fully apparent from the following detailed description of preferred embodiments and appended claims.

BRIEF DESCRIPTION OF THE DRAWINGS

The appended drawings contain figures of preferred embodiments to further illustrate and clarify the above and other aspects, advantages and features of the present invention. It will be appreciated that these drawings depict only preferred embodiments of the invention and are not intended to limits its scope. The invention will be described and explained with additional specificity and detail through the use of the accompanying drawings in which:

FIG. 8 is an enlarged top view of a portion of the table shown in FIG. 1, illustrating the support brace in the extended position and a locking mechanism in a locked position;

FIG. 9 is an enlarged, cross-sectional side view along lines 9—9 of the portion of the table shown in FIG. 8, illustrating the locking mechanism in a locked position;

FIG. 10 is an enlarged, cross-sectional side view of the portion of the table shown in FIG. 9, illustrating the locking mechanism in an unlocked position and the support brace moving from the extended to the collapsed position;

FIG. 16 is an enlarged, perspective view of the clip shown in FIG. 15;

FIG. 17 is an enlarged, cross-sectional side view of the clip shown in FIG. 15, illustrating the clip connected to the lower surface of the table top;

DETAILED DESCRIPTION OF THE PREFERRED EMBODIMENTS

The present invention is generally directed towards a table with a frame that can be connected to the table top without using mechanical fasteners. The principles of the present invention, however, are not limited to tables with frames that can be connected to table tops without using mechanical fasteners. It will be understood that, in light of the present disclosure, the table disclosed herein can be successfully used in connection with other types of furniture and structures.

Additionally, to assist in the description of the table, words such as top, bottom, front, rear, right and left are used to describe the accompanying figures. It will be appreciated, however, that the table can be located in a variety of desired positions—including various angles, sideways and even upside down. A detailed description of the table now follows.

Figure 1:
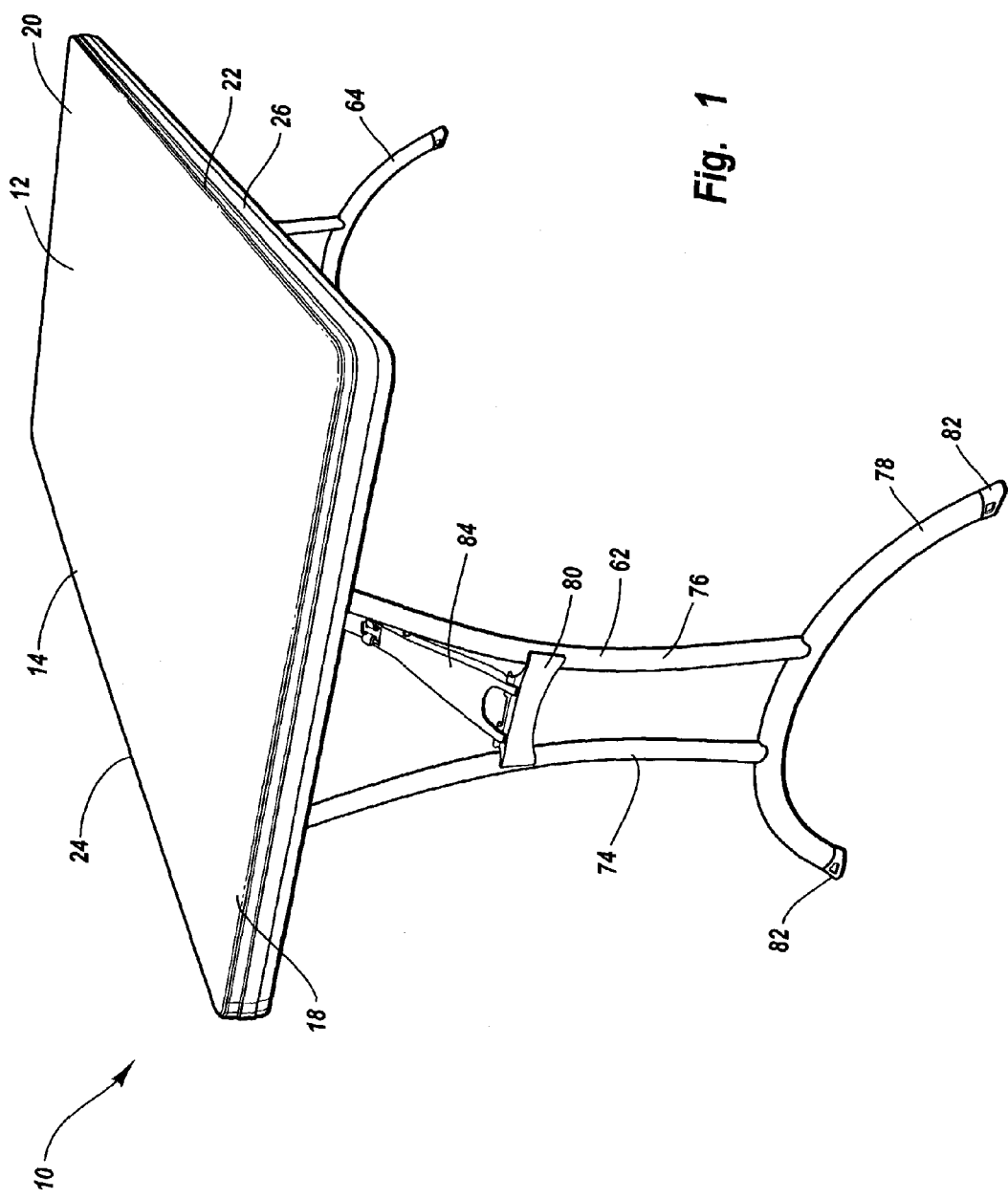
FIG. 1 is a perspective view of a table in accordance with one embodiment of the present invention, illustrating the legs in an extended position.
Figure 2:
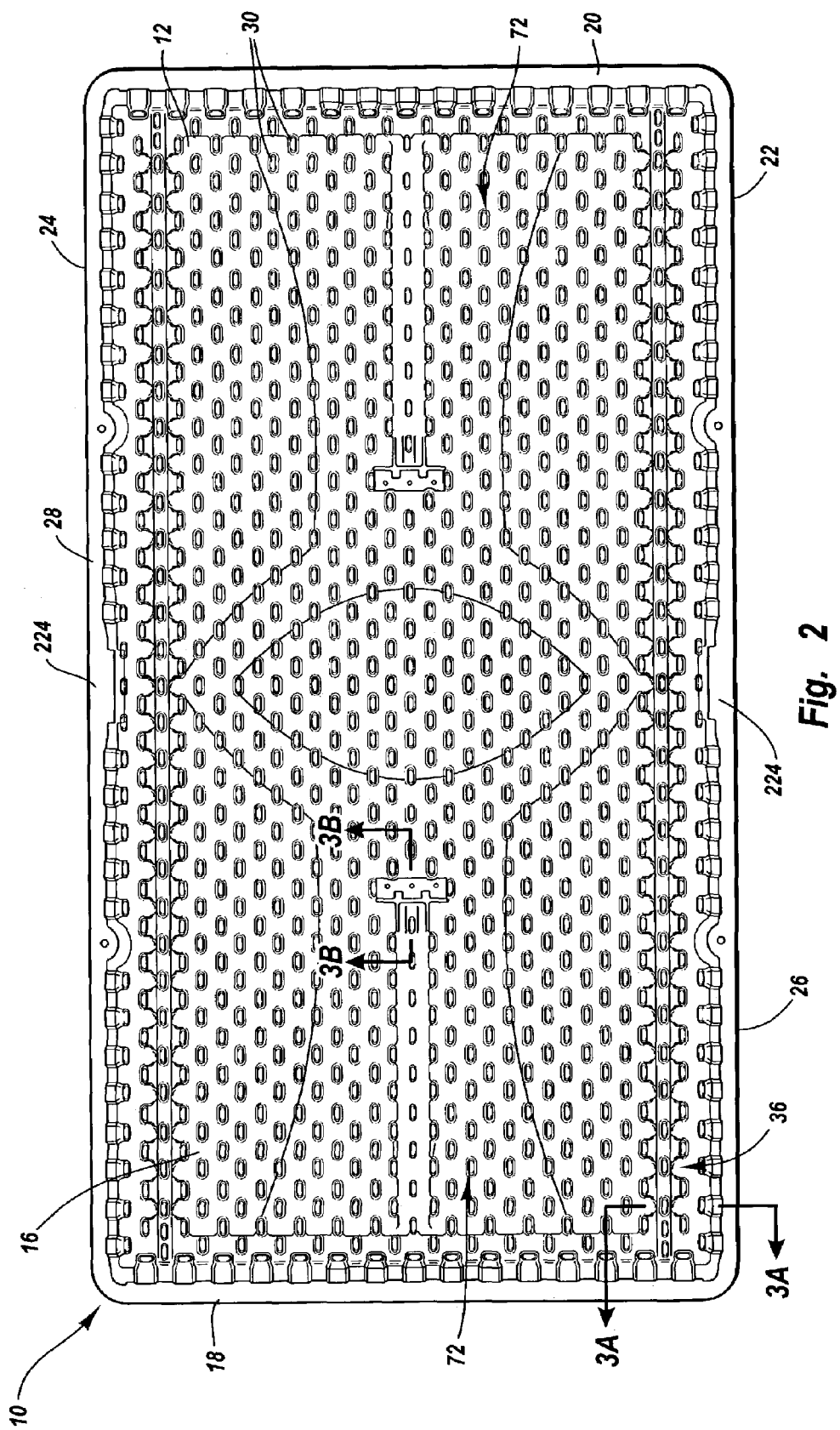
FIG. 2 is a bottom view of a portion of the table shown in FIG. 1, illustrating the frame and legs disconnected from the lower surface of the table top.

As shown in FIGS. 1 and 2, the table 10 includes a table top 12 with an upper surface 14, a lower surface 16, a first end 18, a second end 20, a front side 22 and a rear side 24. The upper surface 14 of the table top 12 is preferably generally planar to create a smooth, flat working surface, but the upper surface could also be textured and have other suitable configurations depending, for example, upon the intended use of the table 10. The table top 12 may also include an edge 26 that is disposed about the outer perimeter or periphery of the table top. All or a portion of the edge 26 may be beveled, sloped or rounded to, for example, increase the comfort and safety of the user. The table top 12 may also include a downwardly extending lip 28 disposed near or at the outer portion of the table top. The lip 28 preferably extends downwardly beyond the lower surface 16 of the table top 12 and the lip may be aligned with or form a part of the edge 26 of the table top. It will be appreciated that the lip 28 may also be spaced inwardly from the edge 26 of the table top 12. Various embodiments of a lip that may be used in conjunction with the table top 12 are disclosed in Assignee's co-pending U.S. patent application Ser. No. 10/096,814, entitled Portable Folding Utility Table with Integral Table Top and Lip, which is hereby incorporated by reference in its entirety.

The table top 12 preferably has a generally rectangular configuration with rounded corners and slightly rounded edges 26. Desirably, the table top 12 has a relatively large size and it is configured for use as a banquet style table. In particular, the table top 12 may have a length of about five feet (or about sixty inches) and a width of about two and one-half feet (or about thirty inches), but the table top can be larger or smaller. For example, the table top 12 could be six or eight feet in length, and the table top could be two or three feet in width. One skilled in the art will appreciate that the table top 12 can be larger or smaller according, for example, to the intended use of the table 10. Additionally, the table top 12 may have other suitable shapes and configurations such as square, circular, oval, and the like depending, for example, upon the intended use of the table 10. In addition, the corners and edges 26 of the table top 12 do not have to rounded and, in contrast, the corners and edges could have any desirable configuration, but the rounded features may increase the comfort and/or safety of the user. Further, the table top 12 could be sized and configured for use with other types of tables such as utility tables, card tables, personal-sized tables, and the like.

The table top 12 is preferably constructed from a lightweight material and, more preferably, the table top is constructed from plastic, such as high density polyethylene. The plastic table top 12 is desirably formed by a blow-molding process because, for example, it allows a strong, lightweight, rigid and sturdy table top to be quickly and easily manufactured. Advantageously, the blow-molded plastic table top 12 is lighter weight that conventional table tops constructed from wood or metal. The blow-molded plastic table top 12 is lightweight because it is substantially hollow. It will be appreciated that the substantially hollow table top 12 can include table tops that are generally hollow or completely hollow.

The table top 12 is preferably constructed from blow-molded plastic because blow-molded plastic table tops are relatively durable, weather resistant, temperature insensitive, corrosion resistant, rust resistant, and blow-molded plastic generally does not deteriorate over time. One skilled in the art, however, will appreciate that the table top 12 does not have to be constructed from blow-molded plastic and other suitable materials and/or processes can be used to construct the table top such as other types of plastics, polymers and synthetic materials. In addition, the table top 12 may be constructed from other materials with sufficient strength and desirable characteristics such as plywood, particle board, solid wood, wood slates, metal alloys, fiberglass, ceramics, graphite, and the like.

The upper surface 14 and the lower surface 16 of the table top 12 are spaced apart a given distance and these two spaced apart surfaces help create a rigid and strong table top 12. Preferably, the upper surface 14 and the lower surface 16 are separated by a generally constant distance so that the surfaces are generally aligned in parallel planes. The upper and lower surfaces 14, 16 of the table top 12 may also be interconnected by one or more tack-offs, kiss-offs or depressions 30, or other reinforcement structures, which may be sized and configured to further increase the strength and rigidity of the table top 12. Advantageously, the depressions 30 and/or other reinforcement structures can be integrally formed as part of a unitary, one-piece table top 12 during the blow-molding process.

Figure 3:
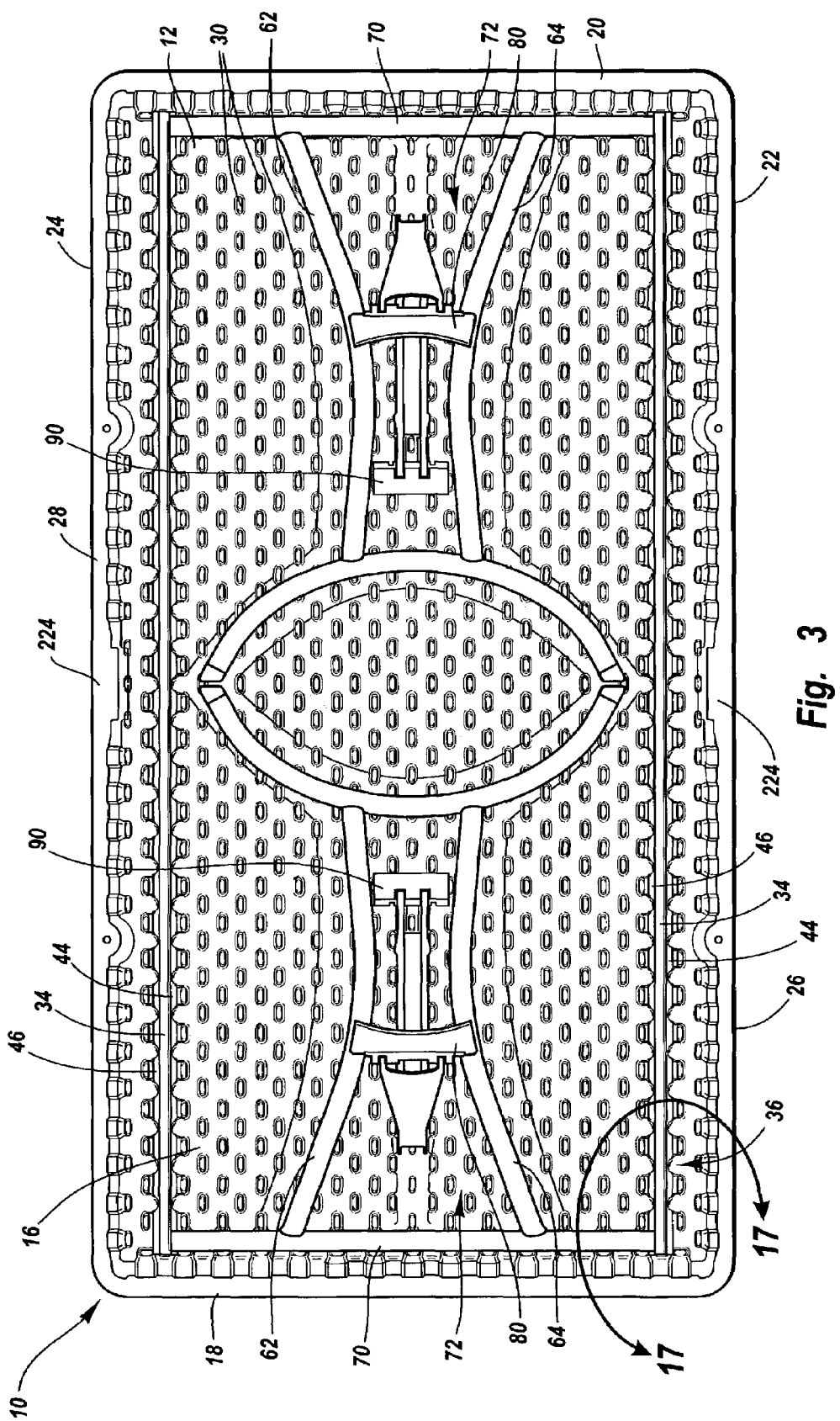
FIG. 3 is a bottom view of the table shown in FIG. 1, illustrating the frame attached to the lower surface of the table top and the legs in a collapsed position.

The depressions 30 are preferably located in the lower surface 16 of table top 12 and the depressions are preferably sized and configured to increase the strength and structural integrity of the table top. The depressions 30 preferably extend towards the upper surface 14 of the table top and the ends of the depressions 30 may contact or engage the upper surface of the table top 12, or the ends of the depressions may be spaced from the upper surface of the table top. As shown in FIGS. 2 and 3, the depressions 30 preferably cover substantially the entire lower surface 16 of the table top 12, but it will be appreciated that the depressions may cover only a portion of the table top. Additionally, while the depressions 30 are shown and described as being located in the lower surface 16 of the table top 12, it will be appreciated that the depressions could be formed in any desired portion of the table top. For example, it will be appreciated that one or more depressions 30 may be formed in the upper surface 14 of the table top 12 and one or more depressions may be formed in the lower surface 16 of the table top, and these opposing depressions may be generally aligned. At least a portion of these opposing depressions 30 may contact or engage each other, but the opposing depressions do not have to touch or engage.

The depressions 30 are preferably arranged into a predetermined pattern or array in order to increase the strength and structural integrity of the table top 12. In particular, the depressions 30 are preferably spaced closely together in a predetermined pattern such that the distance between the depressions is minimized. Advantageously, minimizing the distance between the depressions 30 may minimize the unsupported areas of the upper surface 14 of the table top 12, which may increase the smoothness of the upper surface of the table top. In addition, minimizing the distance between the depressions 30 may increase the structural integrity and strength of the table top 12. Thus, the depressions 30 are desirably closely spaced on the lower surface 16 of the table top 12 such that the depressions are separated by a minimum distance in order to create a table top with greater strength, structural integrity, and an upper surface 14 with increased smoothness.

Advantageously, the increased structural integrity and strength of the table top 12 may allow the outer wall thickness of the table top to be decreased, which may allow less plastic to be used to construct the table 10. Because less plastic may be required to construct the table top 12, that may allow the cost of the table 10 to be decreased. In addition, the blow-molded table top 12 may cool more quickly during the manufacturing process because of the thinner outer wall. This allows the table top 12 to be removed from the manufacturing mold more quickly and it may allow the table top to be removed at a higher temperature because it dissipates heat much more rapidly. Significantly, because the cycle time required to construct the table top 12 may be decreased, the manufacturing efficiency may be increased.

The depressions 30 are also preferably arranged in a predetermined pattern with a generally constant and uniform spacing so that the table top 12 has generally uniform characteristics. In particular, the depressions 30 are preferably arranged into a uniform pattern across the entire surface of the table top 12 so that the strength, structural integrity and/or other characteristics of the table top are generally uniform throughout the table top. Thus, the table top 12 has fewer, if any, weak or unsupported portions which decrease the strength and structural integrity of the table top. Thus, the depressions 30 may be used to create a table top 12 with generally uniform characteristics throughout the table top.

Desirably, other features formed in the table top 12 are sized and configured such that they do not significantly disturb or disrupt the desired pattern of depressions 30. In addition, the depressions 30 are preferably integrally formed in the table top 12 as part of a unitary, one-piece structure. Advantageously, the depressions 30 can be integrally formed in the table top 12 during the blow-molding process. Additional details regarding the size, shape and configuration of depressions that are suitable for use in connection with the table top 12 are disclosed in Assignee's co-pending U.S. patent application Ser. No. 10/409,000, entitled High-Strength, Lightweight Blow-molded Plastic Structures, which is hereby incorporated by reference in its entirety.

Figure 3A:
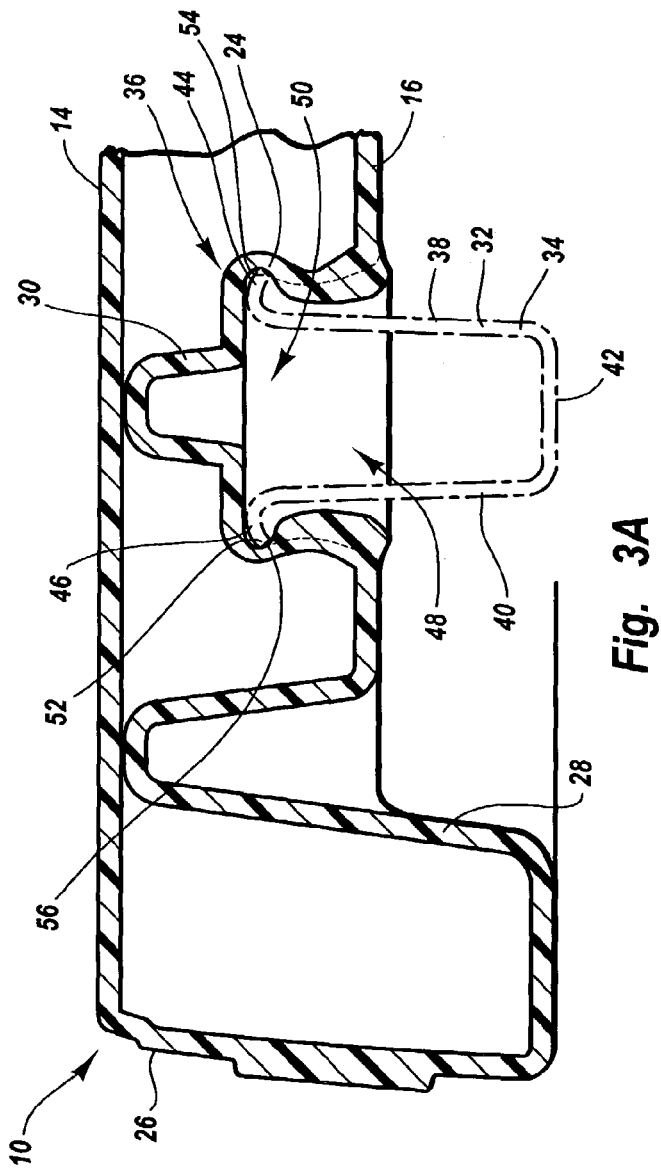
FIG. 3A is an enlarged, cross-sectional side view along lines 3A—3A of the table top shown in FIG. 3, illustrating a portion of the frame attached to the table top by a frame mounting portion and a downwardly extending lip.
Figure 4:
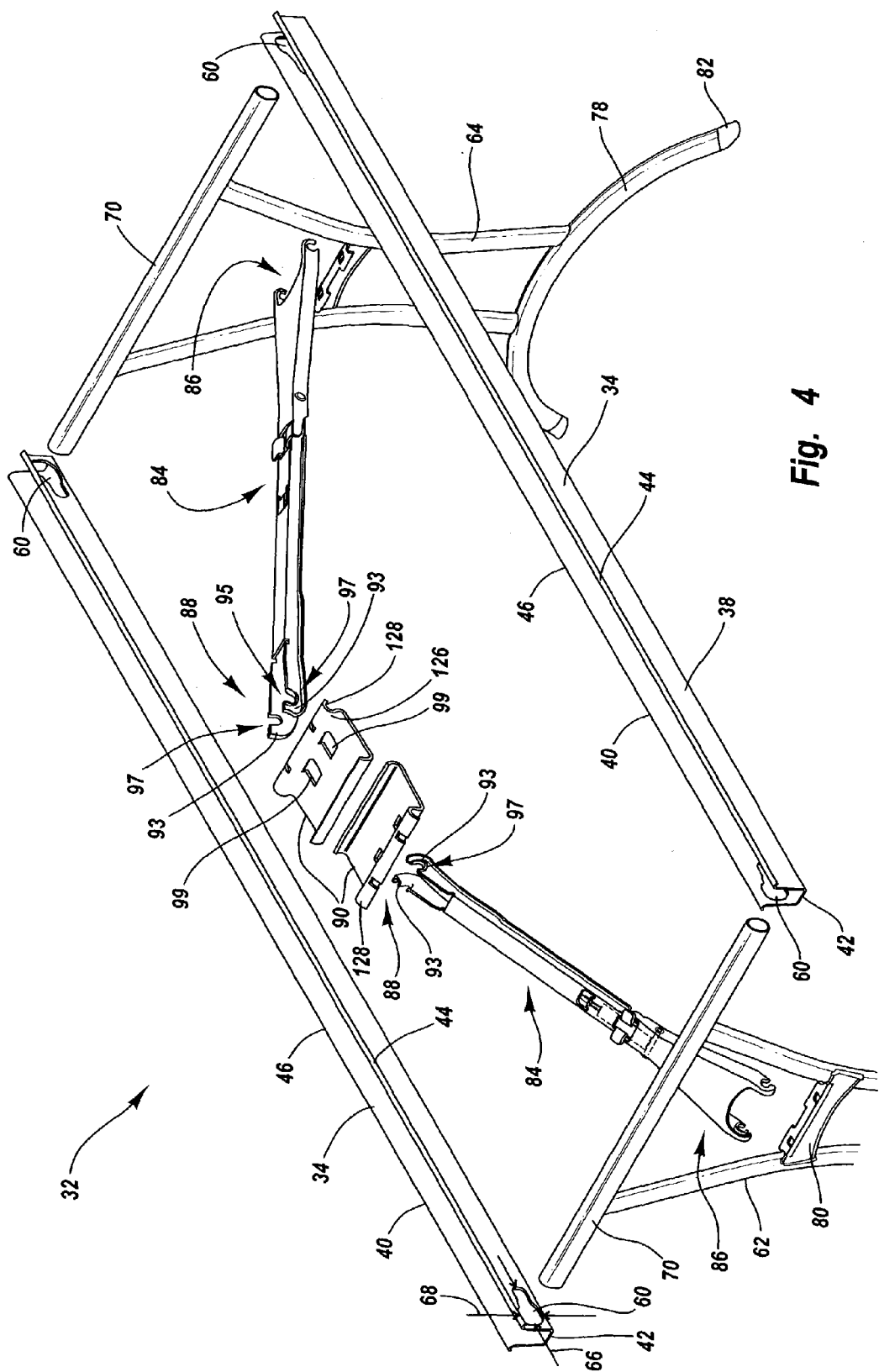
FIG. 4 is an exploded, perspective view of a portion of the table shown in FIG. 1, illustrating the legs, frame, support braces and brackets.

As best seen in FIGS. 3, 3A and 4, a frame 32 is connected to the lower surface 16 of the table top 12. The frame 32 desirably includes two side rails 34 that extend along the length of the table top 12 and the side rails are preferably positioned near opposing edges 26 of the table top. In particular, the side rails 34 are preferably disposed inwardly from the lip 28 such that there is a gap or space between the side rails and the lip. The side rails 34 preferably extend almost the entire length of the table top 12 to provide increased strength and rigidity for the table top, but the side rails may extend along only a portion of the length of the table and the side rails may not be required to provide increased strength or rigidity to the table top.

The frame 32 is desirably constructed from metal, which may easily be formed into the desired configuration by known operations such as stamping and bending, and the metal may be coated or painted as desired. The frame 32 may also include one or more end rails attached to the ends of the side rails 34 and the frame may provide attachment points for the legs, as discussed in more detail below. While the frame 32 preferably includes two side rails 34 that are generally aligned in a parallel configuration, it will be appreciated that the frame may have other suitable configurations and arrangements depending, for example, upon the size and shape of the table top 12 or the intended use of the table 10.

The frame 32 is desirably connected to the lower surface 16 of the table top 12 by one or more frame mounting portions 36 that allow the frame to be connected to the table top by a snap, friction or interference fit. Advantageously, the connection of the frame 32 to the table top 12 does not require the use of mechanical fasteners such as bolts or screws, which desirably expedites the manufacturing or assembly process, but fasteners may be used if desired. Additionally, because screws, bolts and other types of mechanical fasteners are not required to attach the frame 32 to the table top 12, no holes or other types of stress concentrations are formed in the table top. Thus, the strength and structural integrity of the table top 12 is not compromised by drilling holes in the table top. In addition, because the frame 32 is preferably not bonded to the lower surface 16 of table top 12, the table top is not weakened or damaged by adhesive. Thus, strength and integrity of the table top 12 may be retained because the frame 32 is not screwed, bolted or bonded directly to lower surface 16 of the table top. Further, the attachment of the frame 32 to the frame mounting portions 36 may reduce the likelihood of deformation or damage to the table top. Finally, the connection of the frame 32 to the table top 12 without using mechanical fasteners or adhesive may facilitate assembly of the table 10 by the retailer or consumer.

The frame mounting portions 36 are sized and configured to retain the frame 32 in a generally fixed position and to prevent the unintended removal of the frame from the table top 12. The frame mounting portions 36 desirably have about the same length as the side rails 34 and this allows the frame 32 to be connected to the frame mounting portions along the entire length of the side rails. Advantageously, any forces acting on the table top 12 and/or the frame 32 are distributed over a large area. In contrast, conventional tables that attached the frame to the table top by mechanical fasteners distributed forces over a much smaller area, which makes conventional tables much more likely to fail. Therefore, the frame mounting portions 36 may provide a very secure attachment of the frame 32 to the table top 12 even though mechanical fasteners are not required. It will be appreciated that the frame mounting portions 36 may have a length less than the frame 32 so that only portions of the frame are attached to the frame mounting portions.

As best seen in FIGS. 3A and 4, the side rails 34 of the frame 32 preferably have a generally U-shaped configuration with a first side 38, a second side 40, and a connecting portion 42. The first side 38 of the side rail 34 includes an engaging portion 44 and the second side 40 includes an engaging portion 46. The engaging portions 44, 46 are spaced apart a distance and the engaging portions are sized and configured to securely attach the side rails 34 of the frame 32 to frame mounting portions 36. Because the frame mounting portions 36 are desirably integrally formed in the table top 12 as part of a unitary, one-piece structure, the frame 32 can be directly attached to the table top 12.

As shown in FIG. 3A, the frame mounting portion 36 includes an opening 48 and a recess 50 that is sized and configured to receive a portion of the side rails 34. In particular, the opening 48 to the frame mounting portion 36 is preferably slightly smaller than the distance separating the engaging portions 44, 46 of the side rails 34. Thus, when the engaging portions 44, 46 of the side rails 34 are inserted into the opening 48, the engaging portions 44, 46 must deflect inwardly and/or the opening must deform to allow the side rails to be inserted into the recess 50 of the frame mounting portion 36. Once the engaging portions 44, 46 are inserted into the recess 50, the engaging portions and/or the opening 48 resiliently or elastically return to there respective original positions to secure the side rail 34 within the frame mounting portion 36.

The engaging portions 44, 46 of the side rails 34 may engage one or more corresponding surfaces within the recess 50 to help secure the frame 32 to the table top 12. As seen in FIGS. 3A and 4, the engaging portions 44, 46 are preferably the ends of the first side 38 and second side 40 of the side rail 34 that are bent outwardly at an angle less than about 90° relative to the first and second sides, respectively. The engaging portions 44, 46 preferably include sharp edges 52 that are sized and configured to engage corresponding side walls 54, 56 of the recess 50. Advantageously, the sharp edges 52 engage and bite into the softer, blow-molded plastic material of the recess 50 to allow the frame 32 to be securely connected to the table top 12. Significantly, the engagement of the engaging portions 44, 46 and the edges 52 to the recess 50 provides a large contact area between the frame 32 and the frame mounting portions 36.

As seen in FIGS. 2, 3 and 3A, the frame mounting portions 36 are formed in the lower surface 16 of the table top 12 and one or more depressions 30 are preferably formed in the lower portion of the recess 50 so that a generally consistent, uniform pattern of depressions is formed in the table top 12. Advantageously, this helps create a table top 12 with increased strength, structural integrity and generally uniform characteristics. One skilled in the art will appreciate that the depressions 30 could have other suitable arrangements and depressions do not have to be formed in the lower portion of the recess 50.

In addition, because at least a portion of the side rails 34 are inserted into the recesses 50, the side rails and the connecting portion 42 of the frame 32 do not extend a large distance away from the lower surface 16 of the table top 12. This may allow a table 10 with a low profile to be designed and manufactured. Significantly, if the height of the table top 12 is relatively small, then the tables 10 may be more easily stacked. This may assist in the shipping and storage of the tables 10. Additionally, the lip 28 may have a height that is larger than or equal to the distance that the side rails 34 extend from the lower surface 16 of the table top 12 so that the frame is generally hidden from view when the table 10 is viewed from a plane generally aligned with the upper surface 14 of the table top 12. Advantageously, because the frame 32 may be completely or generally hidden from view, the frame does not have to be finished and it may contain visible imperfections or flaws. In addition, because the frame 32 may be completely or generally hidden from view by the lip 28, a more aesthetically pleasing table 100 may be created. It will be appreciated, however, that the lip 28 does not have to hide all or a portion of the frame 32 from view.

As shown in the accompanying figures, the frame 32 engages or abuts several different surfaces of the frame mounting portions 36 to securely attach the frame to the table top 12. The engagement of the side rails 34 to several different surfaces of the frame mounting portions 36 over an extended length allows any forces or loads on the table top 12 and the frame 32 to be distributed over a large area, which helps prevent failure of the table 10. Additionally, because the engaging portions 44, 46 of the side rails 34 preferably extend outwardly and are spaced wider apart than the opening 48 to the frame mounting portions 36, a secure snap, friction or interference connection of the frame 32 to the table top 12 may be established. Further, the side rails 34 and the frame mounting portions 36 are preferably generally symmetrical to help prevent undesirable twisting of the frame. 32 and/or table top 12.

Advantageously, the frame 32 can be quickly and easily connected to the table top 12 by inserting the engaging portions 44,46 of the side rails 34 into the openings 48 in the frame mounting portions 36. As discussed above, mechanical fasteners such as screws or bolts are not required to connect the frame 32 to the table top 12, but such fasteners may be used if desired. In addition, the frame 32 can be more easily disconnected from the table top 12, if desired, because mechanical fasteners do not have to be removed. Other suitable embodiments for connecting a frame to a table top are disclosed in Assignee's co-pending U.S. patent application Ser. No. 10/409,259, entitled Table with Frame That Can Be Attached to the Table Top without Mechanical Fasteners, which is hereby incorporated by reference in its entirety.

Figure 6:
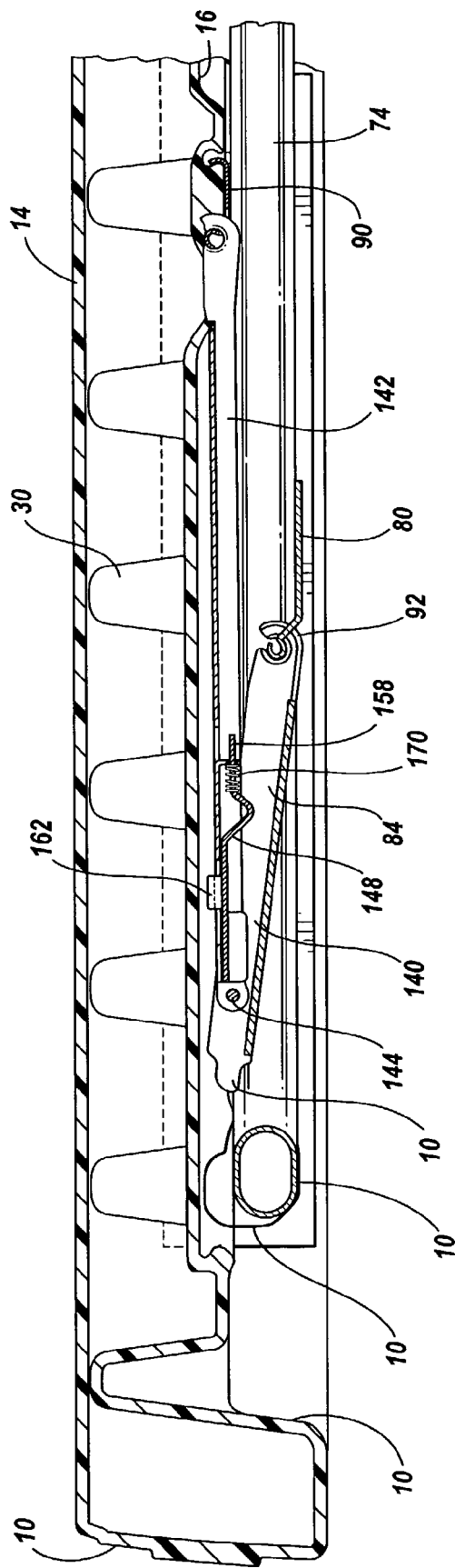
FIG. 6 is an enlarged, cross-sectional side view of a portion of the table shown in FIG. 1, illustrating the leg and the support brace in the collapsed position.
Figure 7:
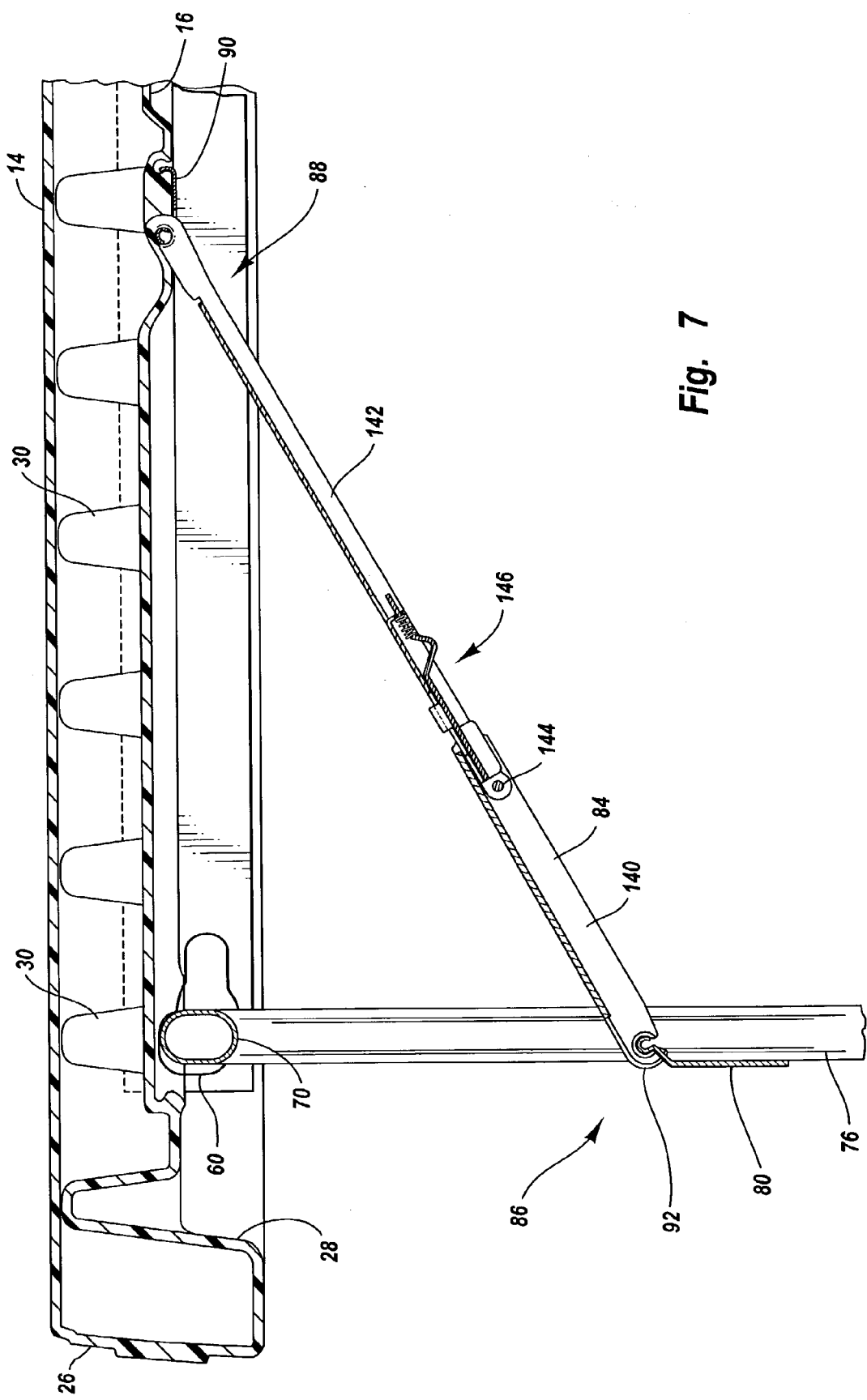
FIG. 7 is an exploded, cross-sectional side view of a portion of the table shown in FIG. 1, illustrating the leg and the support brace in the extended position.

As best seen in FIGS. 4, 6 and 7, the side rails 34 of the frame 32 include openings 60 that are sized and configured to allow legs 62, 64 to be attached to the table 10. The legs 62, 64 are sized and configured to support the table top 12 above a surface such as a floor and the legs may be adjustable in length. The legs 62, 64 are preferably disposed between the side rails 34 of the frame and the openings 60 are preferably located near the ends of the side rails 34 in generally aligned pairs. It will be appreciated that the openings 60 could be positioned in any desired locations depending, for example, the configuration of the legs 62, 64 and/or the frame 32.

The openings 60 preferably have a non-circular configuration such as oval, oblong, egg-shaped, kidney-shaped, key-shaped, etc., which is sized and configured to receive a portion of the legs 62, 64. As shown in the accompanying figures, the openings 60 include a length 66 that is generally aligned with the longitudinal length of the side rails 34 and a height 68 that is generally aligned with the height of the side rails. It will be appreciated that one or more bushings, sleeves, bearings, and the like may be used in conjunction with openings 60 to facilitate the connection of the legs 62, 64 to the frame.

The legs 62, 64, which are movable between a first extended position in which the legs extend away from the table top 12 and a second collapsed position in which the legs are positioned near the table top for storage, include a connecting rod 70 that is sized and configured to be inserted into the openings 60 in the side rails 34 of the frame 32. The rotation of the connecting rod 70 within the opening 60 allows the legs 62, 64 to move between the first and second positions relative to the table top 12.

As best seen in FIGS. 2 and 3, the lower surface 16 of the table top 12 includes receiving channels 72 that are sized and configured to receive at least a portion of the legs 62, 64 in the collapsed position. The receiving channels 72 advantageously receive at least a portion of the legs 62, 64 to decrease the height of the table 10 in the storage position. This allows more tables 10 to be stacked and stored in a limited amount of space, and this may facilitate shipping and transportation of the tables. As shown in the accompanying figures, one or more depressions 30 are preferably located in the receiving channels 72 so that the consistent pattern and arrangement of depressions is maintained. It will be appreciated, however, that depressions 30 do not have to be formed in the receiving channels 72 and receiving channels do not have to be formed in the table top 12.

The connecting rod 70 preferably has a non-circular cross-sectional configuration and the openings 60 in the side rails 34 of the frame 32 also preferably have a non-circular configuration. For example, the openings 60 and the connecting rod 70 may have a configuration that is oval, oblong, egg-shaped, kidney-shaped, key-shaped, etc. Desirably, the non-circular opening 60 and the non-circular cross-sectional configuration of the connecting rod 70 are sized and configured such that the connecting rod is not securely held within the opening when the legs are in the collapsed position. Thus, in the collapsed position, one or more small gaps or spaces are located between connecting rod 70 and the opening 60 so that the connecting rod can move slightly within the opening. Advantageously, this allows the legs 62, 64 to be more easily connected to the side rails 34 because of the larger clearance.

Additionally, because there is some movement or "play" between the legs 62, 64 and the side rails 34 when the legs are in the collapsed position, that may allow the legs to fold flatter such that the legs contact and/or are generally parallel to the lower surface 16 of the table top 12. Further, the movement of the legs 62, 64 within the openings 60 may allow the legs to be positioned in the desired collapsed position even if, for example, there is some slight imperfection in the table 10 or if a portion of the table has expanded or contracted due to temperature. Accordingly, the tables 10 may be more easily manufactured and assembled because of the greater tolerances, and the tables may fold flatter to facilitate stacking of the tables.

When the legs 62, 64 are in the extended position, however, the connecting rod 70 is preferably securely held within the openings 60 to rigidly and securely attach the legs to the table top 12. In particular, when the connecting rod 70 is rotated within the openings 60 to the extended position, the connecting rod and openings are sized and configured such that there is no or very little movement or play between the connecting rod and the openings. Thus, the legs 62, 64 desirably do not shake or wobble in the extended position.

For example, the openings 60 in the side rail 34 may have a height of about 0.94 ($^{15}/_{16}$) inches and an overall length of about 1.5 inches, and the connecting rod 70 may have an oval configuration with a height of about 0.94 ($^{15}/_{16}$) inches and a width of about 0.75 ($^{3}/_{4}$) inches. Advantageously, these sizes and configurations allow the connecting rod 70 to be relatively easily inserted into the openings 60 and the connecting rod can move slightly within the opening when the legs 62, 64 are in the collapsed position. In particular, as best seen in FIG. 6, the connecting rod 70 can move within the opening 60 because there are gaps or spaces between the connecting rod and the opening. On the other hand, when the legs 62, 64 are in the extended position, the connecting rod 70 is securely held within the opening 60. As best seen in FIG. 7, the upper and lower ends of the connecting rod 70 engage the upper and lower portions of the opening 60 when the legs 62, 64 are in the extended position.

It will be appreciated that the openings 60 and connecting rod 70 can have other suitable sizes and configurations depending, for example, upon the size and/or intended use of the table 10. It will also be appreciated that other suitable combinations of the openings 60 and connecting rod 70 may be utilized, such as the combination of generally circular openings and non-circular connecting rods, or non-circular openings and generally circular connecting rods. Further, it will be appreciated that the legs 62, 64 may be attached to the frame 32 or table top 12 by other suitable types of devices and mechanisms.

Figure 5:
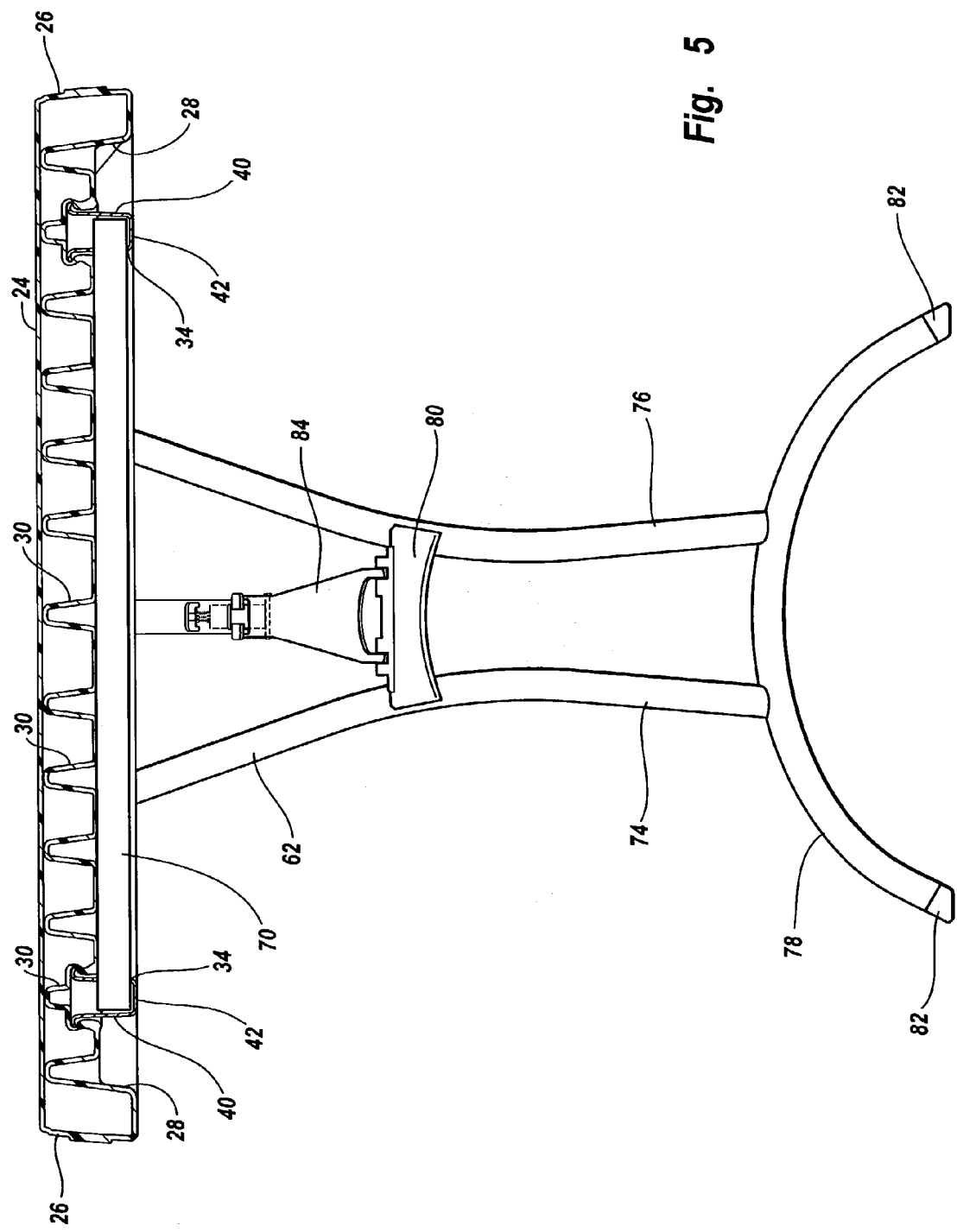
FIG. 5 is an enlarged, cross-sectional side view of a portion of the table shown in FIG. 1, illustrating the leg in an extended position and the cross tube connected to the side rails of the frame.

The legs 62, 64, as best seen in FIGS. 4 and 5, are attached to or include the connecting rod 70 and the legs include a pair of elongated support members 74, 76 and a foot portion 78. Advantageously, the two separate elongated support members 74, 76 may help prevent twisting or torque on the connection of the support members to the connecting rod 70 and the foot portion 78. Additionally, while the elongated support members 74, 76 are preferably welded to the connecting rod 70 and the foot portion 78, the support members may be connected to the connecting rod and foot portion by any suitable method or device.

As best seen in FIG. 5, the elongated support members 74, 76 preferably have a generally curved configuration. In particular, the upper portions of the elongated support members 74, 76 are preferably spaced apart to provide a secure attachment of the support members to the connecting rod 70, the middle portions of the elongated support members are preferably more closely spaced together, and the lower portions of the elongated support members are spaced apart to provide a secure connection to the foot portion 78. The foot portion 78 preferably has an upwardly extending curved section and feet 82 may be connected to the ends of the foot portion. A connecting member 80 is preferably disposed near the middle portion of the elongated support members 74, 76 to help maintain the support members in the desired positions.

The connecting rod 70, elongated support members 74, 76 and foot portion 78 of the legs 62, 64 are desirably constructed from hollow metal tubes because the metal tubes are relatively lightweight and strong. The hollow metal tubes forming the connecting rod 70, elongated support members 74, 76 and foot portion 78 desirably have a generally oval configuration to provide increased strength. Advantageously, the oval configuration may also be used to create a thinner profile for the legs 62, 64, which may create a thinner profile for the table 10 when the legs are in the collapsed position.

It will be appreciated that the legs 62, 64 may be constructed from other materials with the suitable characteristics and the legs may have other shapes and configurations depending, for example, upon the intended use of the table 10. For example, the legs 62, 64 may include only a single elongated support member or multiple elongated support members, and the legs may be constructed as a single component or multiple components that are connected together. It will further be appreciated that the legs 62, 64 need not be in pivotal engagement with frame 32 or the table top 12 to be collapsible. For example, the legs 62, 64 may be detachably connected to the table top 12 such that when it is desired to collapse the table 10 for storage, the legs are detached from the table top. Other suitable embodiments for connecting legs to a table top are disclosed in Assignee's copending U.S. patent application Ser. No. 10/408,917, entitled Pivotal Connection of a Table Leg to a Frame, which is hereby incorporated by reference in its entirety.

A support brace 84 is used to support the legs 62, 64 in the extended position. The support brace 84 includes a first end 86 that is attached to the leg 62, 64 and a second end 88 that is attached to the table top 12 by a mounting member or bracket 90. The support brace 84 is preferably pivotally connected to the leg 62, 64 and the bracket 90 to allow the leg to be moved between the extended and collapsed positions. It will be appreciated that while the legs 62, 64 are in the extended or collapsed positions, the support brace 84 is also in a corresponding extended or collapsed position. Advantageously, the support brace 84 can be connected to the leg 62, 64 and the bracket 90 without the use of mechanical fasteners such as screws, rivets or bolts. Significantly, the table 10 may be built more quickly because fewer components may be required to assemble the table and no mechanical fasteners are needed to attach the support brace 84 to the legs 62, 64 or the table top 12. It will be appreciated, however, that one or more mechanical fasteners may be used to connect the support brace 84 to the leg 62, 64 and/or the table top 12.

Figure 12:
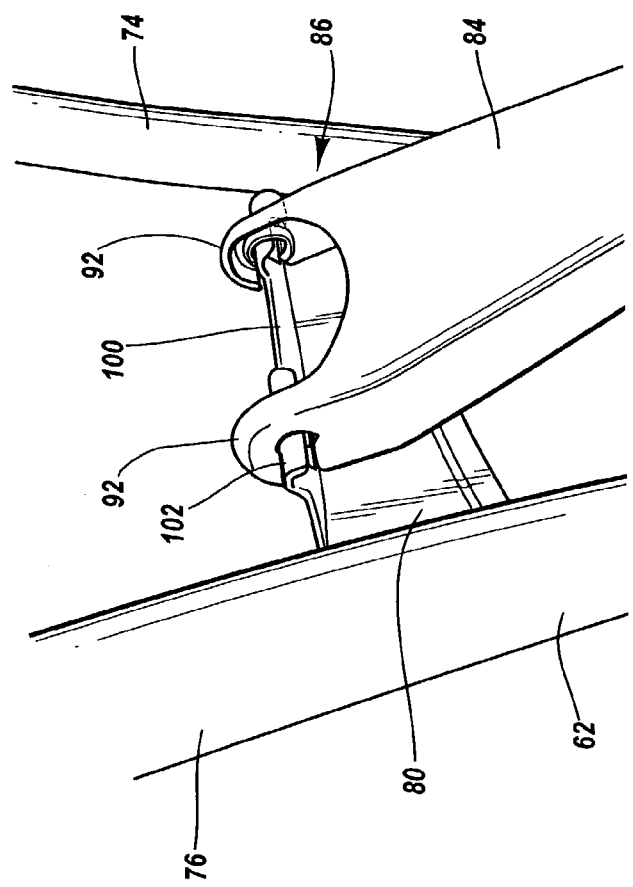
FIG. 12 is an enlarged, exploded top perspective view of a portion of the table shown in FIG. 1, illustrating the connection of the support brace to the leg.
Figure 11:
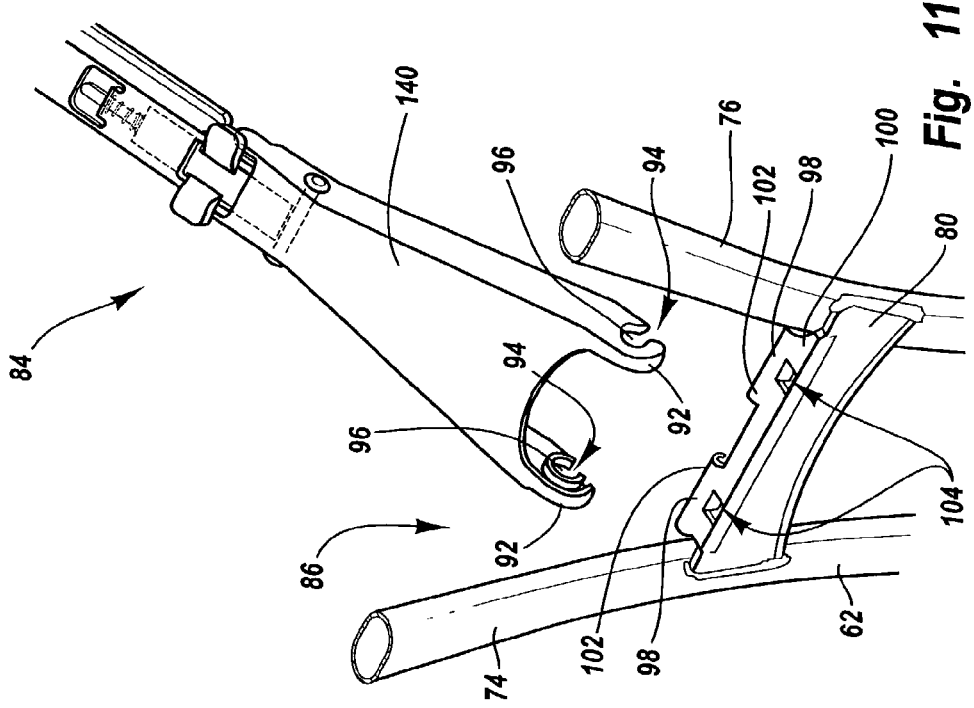
FIG. 11 is an enlarged, exploded top perspective view of a portion of the table shown in FIG. 1, illustrating a portion of the leg and a portion of the support brace.
Figure 13:
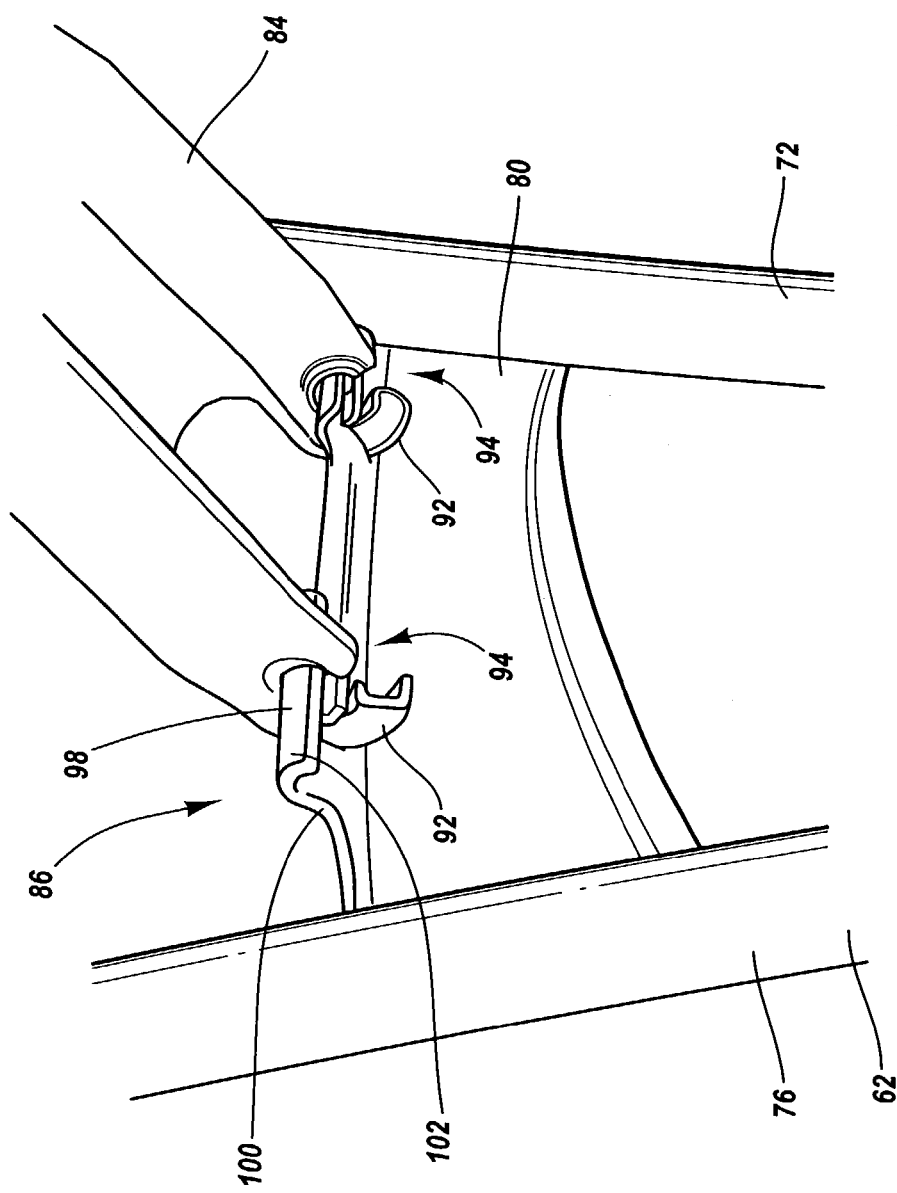
FIG. 13 is an enlarged, exploded bottom perspective view of a portion of the table shown in FIG. 1, illustrating the connection of the support brace to the leg.

In greater detail, as best seen in FIGS. 10, 11 and 12, the first end 86 of the support brace 84 includes two curved arms 92 and each curved arm has an opening 94 that leads to a generally circular interior portion 96. The two generally circular interior portions 96 are generally aligned along the same axis and disposed at the end 86 of the support brace 84. The generally circular interior portions 96 are sized and configured to receive corresponding receiving portions 98 formed in the connecting member 80. In particular, the receiving portions 98 include a flange 100 with rounded ends 102 and corresponding openings 104. The support brace 84 is connected to the leg 62, 64 by disposing the rounded ends 102 of the flange 100 within the generally circular interior portions 96 of the curved arms 92. In addition, the curved arms 92 of the support brace 84 are disposed within the openings 104 in the connecting member 80. Advantageously, when the support brace 84 is connected to the legs 62, 64 and the table top 12, the support brace cannot be inadvertently disconnected from the legs. While this connection of the support brace 84 to the leg 62, 64 does not require that use of any mechanical fasteners, it will be appreciated that mechanical fasteners may be used to connect the support brace to the legs 62, 64.

In order to attach the support brace 84 to the leg 62, 64, the two generally circular interior portions 96 of the curved arms 92 are coaxially aligned with the rounded ends 102 of the flange 100. The rounded ends 102 of the flange 100 are then inserted into the generally circular interior portions 96 of the support brace 84 and the arms 92 are inserted into the openings 104 in the flange. Significantly, when the second end 88 of the support brace 84 is attached to the table top 12, the first end 86 of the support brace cannot be disconnected from the leg 62, 64. This helps create a strong and secure table 10 because the support brace 84 cannot be unintentionally disconnected from leg 62, 64 when the table is assembled. However, when the second end 88 of the support brace 84 is disconnected from the table 10, then the first end 86 of the support brace can be disconnected from the leg 62, 64. This allows the table 10 to be quickly and easily assembled, and it allows the table to be quickly and easily disassembled.

Figure 3B:
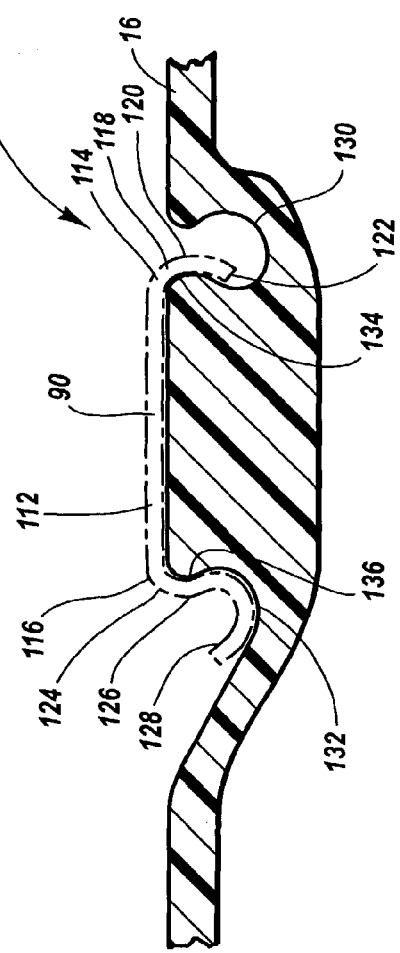
FIG. 3B is an enlarged, cross-sectional side view along lines 3B—3B of the table top shown in FIG. 3, illustrating a portion of a bracket attached to the table top by a bracket mounting portion.

The brackets 90, as best seen in FIGS. 3 and 3B, are connected to the lower surface 16 of the table top 12 by bracket mounting portions 110 that allow the brackets to be connected to the table top by a snap, friction or interference fit. Advantageously, the connection of the brackets 90 to the table top 12 does not require the use of mechanical fasteners such as bolts or screws, which desirably expedites the manufacturing or assembly process, but fasteners may be used if desired. Additionally, because screws, bolts or other types of mechanical fasteners are not required to attach the brackets 90 to the table top 12, no holes or other types of stress concentrations are formed in the table top. Thus, the strength and structural integrity of the table top 12 is not diminished by drilling or forming holes in the table top. In addition, because the brackets 90 are preferably not glued to the lower surface 16 of table top 12, the table top is not weakened or damaged by adhesive. Thus, strength and integrity of the table top 12 may be retained because the brackets 90 are not screwed, bolted or bonded to bottom surface 16 of the table top. Further, the connection of the brackets 90 to the table top 12 without using mechanical fasteners or adhesives may facilitate assembly of the table 10 by the retailer or consumer.

The bracket mounting portions 110 are sized and configured to retain the brackets 90 in generally fixed positions and to prevent the unintended removal of the brackets from the table top 12. Advantageously, the brackets 90 engage a relatively large portion of the table top 12 so that forces applied to the brackets are distributed over a large area. This provides an improved and more secure connection of the brackets 90 to the table top 12 because forces are distributed over a much larger area than brackets attached to a table top only by mechanical fasteners. Additionally, the connection of the brackets 90 to the table top 12 by the bracket mounting portions 110 may be less likely to fail than conventional brackets attached to a table top by mechanical fasteners because of the larger engagement area.

As best seen in FIG. 3B, the bracket 90 includes a main body portion 112 with a first end 114 and a second end 116. The first end 114 of the bracket 90 includes an engaging portion 118 with a rounded flange 120 and an edge 122. The second end 1166 of the bracket 90 includes a retaining portion 124 with a first angled portion 126 and a second angled portion 128. The first angled portion 126 is preferably disposed at an angle less than about 90° with respect to the main body portion 112 of the bracket 90 so that it is angled towards the first end 114 of the bracket 90. As discussed below, the engaging portion 118 and the retaining portion 124 are sized and configured to securely attach the bracket 90 to bracket mounting portion 110 by a snap, friction or interference fit. Additionally, the bracket 90 is preferably directly attached to the table top 12 because the bracket mounting portions 100 are desirably integrally formed in the table top as part of a unitary, one-piece structure. It will be appreciated, however, that the bracket 90 does not have to be directly attached to the table top 12 and the bracket does not have to be attached to the table top by the bracket mounting portions 110.

As shown in FIG. 3B, the bracket mounting portion 110 includes a first recess 130 and a second recess 132 that are sized and configured to receive the first end 114 and the second end 116 of the bracket 90, respectively. In particular, the first recess 130 is disposed towards the middle of the table top 12 and the first recess preferably has a length that is approximately the same as the length of the first end 114 of the bracket 90. A protrusion or lip 134 projects into an upper portion of the first recess 130 and it is sized and configured to fit within the inner portion of the rounded flange 120 on the first end 114 of the bracket 90. The second recess 132 is disposed towards the end of the table top 12 and it has a length that is approximately the same as the length of the second end 116 of the bracket 90. A protrusion or lip 136 extends into an upper portion of the second recess 132 and it is sized and configured to contact or abut at least a portion of the first downwardly extending portion 126 on the second end 116 of the bracket 90. The distance from the first edge 122 on the first end 114 of the bracket 90 to the innermost part of the first downwardly extending portion 126 on the second end 116 of the bracket is preferably smaller than the distance from the protrusion 134 extending into the first recess 130 to the protrusion 136 extending into the second recess 132 of the bracket mounting portion 110, which allows the bracket to be connected to the bracket mounting portion 110 by a snap, friction or interference fit.

In order to connect the bracket 90 to the table top 12, the engaging portion 118 on the first end 114 of the bracket is inserted into the first recess 130 of the bracket mounting portion 110 such that the rounded flange 120 and the edge 122 engage a portion of the table top 12. In particular, the edge 122 preferably engages a portion of the first recess 130 and/or the protrusion 134 and the rounded flange 120 contacts or abuts at least a portion of the protrusion. The second end 116 of the bracket 90 is then inserted into the second recess 132 of the bracket mounting portion 110. As the retaining portion 124 on the second end 116 of the bracket 90 is inserted into the second recess 132, the first angled portion 126 and/or the protrusion 136 deflects or deforms to allow the second end of the bracket to be inserted into the recess. Once the second end 116 of the bracket 90 is inserted into the second recess 132, the first angled portion 126 and/or the protrusion 136 resiliently or elastically returns to there original positions to secure the second end of the bracket in a fixed position. Accordingly, the bracket 90 is preferably connected to the bracket mounting portion 110 of the table top 12 by a snap, friction or interference fit, and this allows the bracket to be securely connected to the table top without the use of fasteners. It will be appreciated, however, that fasteners or adhesives could also be used to secure the bracket 90 to the table top 12 if desired.

The rounded flange 120 on the first end 114 of the bracket 90 preferably has a radius of curvature that generally corresponds to the radius of curvature of the protrusion 134 to help secure the bracket 90 to the bracket mounting portion 110. Similarly, the first angled portion 126 on the second end 116 of the bracket 90 preferably has a radius of curvature that generally corresponds to the radius of curvature of the protrusion 136. This provides a large contact area between the bracket 90 and the bracket mounting portion 110. Additionally, the edge 122 on the first end 114 of the bracket 90 is preferably sharp so that it engages and bites into, the softer, blow-molded plastic material of the table top 12 to allow the bracket 90 to be securely connected to the table top. Significantly, the engagement of the first end 114 and the second end 116 of the bracket 90 to the first recess 130 and the second recess 132 of the bracket mounting member 110, respectively, provides a large contact area that allows forces or loads on bracket to be distributed over a large area, which helps provide a secure and durable connection of the support brace 84 to the table top 12.

As seen in FIG. 2, the bracket mounting portions 110 are formed in the lower surface 16 of the table top 12 and one or more depressions 30 may be formed in the bracket mounting portions so that a generally consistent, uniform pattern of depressions is formed in the table top 12. Significantly, all or only a portion of the depressions 30 may be formed in the bracket mounting portions 110 in order to maintain the generally uniform pattern of depressions. Advantageously, the uniform pattern of depressions 30 may help create a table top 12 with increased strength, structural integrity and generally uniform characteristics. One skilled in the art will appreciate that the depressions 30 could have other suitable arrangements and depressions do not have to be formed in the bracket mounting portions 110.

Figure 14:
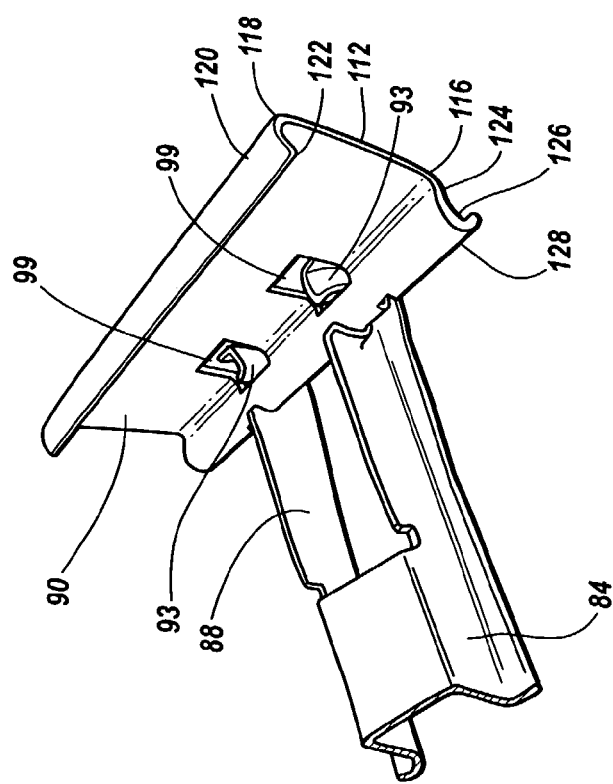
FIG. 14 is an enlarged, top perspective view of a portion of the table shown in FIG. 1, illustrating the connection of the support brace to the mounting bracket.

As discussed above, the second end 88 of the support brace 84 is connected to the bracket 90. As best seen in FIGS. 4 and 14, the second end 88 of the support brace includes two curved arms 93 and each curved arm has an opening 95 that leads to a generally circular interior portion 97. The two generally circular interior portions 97 are generally aligned along the same axis and disposed near the end of the support brace 84. The generally circular interior portions 97 are sized and configured to be connected to the second end 116 of the bracket 90. In particular, the generally circular interior portions 97 are sized and configured to receive a portion of the first angled portion 126 and the second angled portion 128 of the bracket 90. In addition, the curved arms 93 of the support brace 84 are configured to be disposed within openings 99 in the second end 116 of the bracket 90. Advantageously, when the support brace 84 is connected to the legs 62, 64 and the table top 12, the support brace cannot be inadvertently disconnected from the bracket 90. While this connection of the support brace 84 to the bracket 90 does not require that use of any mechanical fasteners, it will be appreciated that mechanical fasteners may be used to connect the support brace to the bracket.

In order to attach the support brace 84 to the bracket 90, the two generally circular interior portions 97 of the curved arms 93 are coaxially aligned with the first angled portion 126 and the second angled portion 128 on the second end 116 of the bracket. The first angled portion 126 and the second angled portion 128 are then inserted into the generally circular interior portions 97 of the support brace 84 and the curved arms 93 are inserted into the openings 99 in the second end 116 of the bracket 90. Significantly, when the support brace 84 is connected to the bracket 90 and the bracket is connected to the table top 12, the support brace cannot be disconnected from the bracket. This helps create a strong and secure table 10 because the support brace 84 cannot be unintentionally disconnected from bracket 90 when the table is assembled. However, when the bracket 90 is disconnected from the table top 12, then the second end 88 of the support brace 84 can be disconnected from the bracket. This allows the table 10 to be quickly and easily assembled and disassembled.

As discussed above, the first end 86 of the support brace 84 may be pivotally connected to the legs 62, 64 and the second end 88 of the support brace may be pivotally connected to the bracket 90. One skilled in the art, however, will appreciate that the ends 86, 88 of the support brace 84 do not have to be pivotally connected to the legs 62, 64 or the bracket 90. Other suitable embodiments for connecting the support brace to the legs and/or the table top are disclosed in Assignee's co-pending U.S. patent application Ser. No. 10/409,469, now U.S. Pat. No. 6,901,867, entitled Pivotal Connection of a Support Brace to a Table Leg and Table Top, which is hereby incorporated by reference in its entirety.

As best seen in FIGS. 7–10, the support brace 84 includes a first arm 140 that is pivotally connected to a second arm 142 by a pin 144. The pivotal connection of the first and second arms 140, 142 allows the support brace 84 to move between the extended position and the collapsed position. When the support brace 84 is in the collapsed position, the legs 62, 64 are also in the collapsed position. Similarly, when the support brace 84 is in the extended position, the legs 62, 64 are also in the extended position. While the support brace 84 preferably pivots to allow the legs 62, 64 to be moved between the extended position and the collapsed position, it will be understood that the support brace does not require the pivotal connection of the first arm 140 and the second arm 142, and the support brace 84 could have other suitable arrangements and/or configurations.

A locking mechanism 146 is preferably used to secure the support brace 84 in the extended position, which consequently also secures the legs 62, 64 in the extended position. Advantageously, the locking mechanism 146 can secure the legs 62, 64 in the extended position regardless of the position or orientation of the table 10. Thus, the legs 62, 64 will not move from the extended position to the collapsed position even if the table 10 is turned on its side or upside-down. In addition, the locking mechanism 146 is preferably biased to remain in the locked position and the locking mechanism positively locks the support brace 84 and the legs 62, 64 in the extended position. Further, the locking mechanism 140 preferably requires the user to intentionally unlock the mechanism to allow the support brace 84 and the legs 62, 64 to move into the collapsed position. Thus, the support brace 84 and the legs 62, 64 can be positively held in the extended position by the locking mechanism 146.

As seen in FIGS. 8–10, the locking mechanism 146 includes an elongated body 148 that is generally sized and configured to fit within the second arm 142 of the support brace 84. In particular, the second arm 142 of the support brace 84 has a generally U-shaped configuration with two opposing sidewalls 150, 152 and the elongated body 148 of the locking mechanism 146 is generally disposed between the sidewalls and towards the end of the second arm nearest the first arm 140. The elongated body 148 of the locking mechanism 146 includes a first end 154 that is sized and configured to engage the pin 144 and a second end 156 with an elongated extension 158. Two outwardly extending tabs or flanges 160, 162 are disposed between the ends 154, 156 of the locking mechanism 146 and the tabs extend through an opening 164 in the second arm 142 of the support brace 84. The elongated extension 158 on the second end 156 of the locking mechanism 146 extends through an opening 166 in a flange 168 extending from the second arm 142 of the support brace 84. A biasing member such as a spring 170 is disposed about the elongated extension 158 and the biasing member is positioned between the flange 168 and the elongated body 148 of the locking mechanism 146.

The locking mechanism 146 is movable relative to the second arm 142 between a locked position in which the elongated body 148 is disposed proximate the end of the second arm nearest the first arm 140, and an unlocked position in which the elongated body is disposed inwardly from the end of the second arm and away from the first arm. The spring 170 is desirably sized and configured to bias the locking mechanism 146 into the locked position. In this locked position, the first end 154 of the elongated body 148 contacts the pin 144 and the outwardly extending tabs 160, 162 are disposed towards the end of the second arm 142 of the support brace 84. In the unlocked position, the first end 154 of the elongated body 148 is spaced apart from the pin 144 and the outwardly extending tabs 160, 162 are spaced away from the end of the second arm 142 of the support brace 84. One skilled in the art will appreciate that other suitable types of biasing mechanisms may be used to bias the locking mechanism 146 into the locked position.

The first and second arms 140, 142 of the support brace 84 are generally aligned and at least a portion of the arms overlap when the support brace is in the extended position. In particular, as best seen in FIGS. 8 and 9, the first arm 140 of the support brace 84 includes two extensions 172, 174 and the extensions are generally parallel to and overlap portions of the sidewalls 150, 152 of the second arm 142 when the support brace is in the extended position. When the locking mechanism 146 is in the locked position, the locking mechanism maintains the extensions 172, 174 in the generally parallel and overlapping position with the sidewalls 150, 152 of the second arm 142. Specifically, the outwardly extending tabs 160, 162 engage the extensions 172, 174 to prevent the first arm 140 from moving relative to the second arm 142. Thus, the outwardly extending tabs 160, 162 prevent the first arm 140 from pivoting relative to the second arm 142, and that maintains the support brace 84 and the legs 62, 64 in the extended position.

On the other hand, when the support brace 84 is in the collapsed position, the extensions 172, 174 do not overlap portions of the sidewalls 150, 152 of the second arm 142 of the support brace 84. In contrast, as best seen in FIG. 6, the extensions 172, 174 are spaced away from the second arm 142 of the support brace 84 and at least a portion of the second arm may be disposed inside the body of the first arm 140 to form a small, compact arrangement. Advantageously, the support brace 84 does not significantly protrude from the lower surface 16 of the table top 12 in the collapsed position. This allows a table 10 with a relatively small height when the legs 62, 64 are in the collapsed position to be constructed, if desired.

When the locking mechanism 146 is in the unlocked position, the locking mechanism does not secure the support brace 84 in the extended position. In contrast, the locking mechanism 146 allows the first and second arms 140, 142 of the support brace 84 to freely move with respect to each other. In particular, as shown in FIG. 1O, when the user moves the locking mechanism 146 into the unlocked position, the outwardly extending tabs 160, 162 no longer engage the extensions 172, 174 and that allows the first and second arms 140, 142 of the support brace 84 to freely rotate. Desirably, when the user releases the locking mechanism 146, the spring 170 causes the locking member to return to its locked position.

As best seen in FIGS. 6, 9 and 10, the extensions 172, 174 have a curved front surface 176 and a generally straight rear surface 178 to positively secure the locking mechanism 146 in the locked position, and to allow the support brace 84 to be moved from the collapsed position to the extended position without the user unlocking the locking mechanism 146. In particular, the curved front surfaces 176 of the extensions 172, 174 are sized and configured to engage the outwardly extending tabs 160, 162 of the locking mechanism 146 when the support brace 84 is moved from the collapsed position to the extended position. Specifically, the curved front surfaces 176 engage the outwardly extending tabs 160, 162 and push the locking member 146 into the unlocked position. When the support brace 84 is in the extended position and the first and second arms 140, 142 are generally aligned, the curved front surfaces 176 of the extensions 172, 174 no longer engage the tabs 160, 162 and the spring 170 returns the locking mechanism 146 to the locked position. Thus, the locking member 146 allows the support brace 84 to be moved from the collapsed position to the extended position without requiring the user to unlock the locking mechanism.

The generally straight rear surfaces 178 of the extensions 172, 174 prevent the locking mechanism 146 from being inadvertently unlocked and allowing the support brace 84 to move from the extended position to the collapsed position. In particular, the generally straight rear surfaces 178 of the extensions 172, 174 engage the generally planar lower surfaces of the tabs 160, 162, and this engagement of the extensions and tabs prevents the support brace 84 from moving from the extended position to the collapsed position. In order to allow the support brace 84 to move from the extended position to the collapsed position, the user must intentionally unlock the locking mechanism 146, and this allows the support brace and the legs 62, 64 to be collapsed.

Significantly, the locking mechanism 146 is lightweight and includes few moving parts. In particular, the locking mechanism 146 is preferably constructed from metal and it can be stamped or formed into the desired configuration. Additionally, the second arm 140 is preferably constructed from metal and the opening 164, opening 166 and flange 168 can be stamped or formed into the desired configuration. While the first arm 140, second arm 142 and the locking mechanism 146 are preferably unitary components, it will be appreciated that these components may be constructed from multiple parts that are connected together. Further, these components may have other suitable configurations and arrangements depending, for example, upon the size and/or intended use of the table 10.

In operation of the locking mechanism 146, when the second arm 142 is in the collapsed position and being rotated into the extended position, the curved front surfaces 176 of the extensions 172, 174 engage the outwardly extending tabs 160, 162. The rotation of the second arm 142 relative to the first arm 140 causes the extensions 172, 174 to push the outwardly extending tabs 160, 162 and the locking member 146 into the unlocked position. When the support brace 84 is in the extended position, the extensions 172, 174 no longer engage the outwardly extending tabs 160, 162 and the spring 170 forces the locking member 146 into the locked position. Alternatively, instead of the extensions 172, 174 moving the locking mechanism 146 into the unlocked position while the support brace 84 is being moved from the collapsed position to the extended position, the user may manually move the locking mechanism into the unlocked position. In order to move the support brace 84 and legs 62, 64 from the extended position to the collapsed position, the user slides the locking mechanism 146 into the unlocked position, as shown in FIG. 10, which allows the second arm 142 to rotate relative to the first arm 140. Once the arms 140, 142 are not longer in the extended position, the user can release the locking mechanism 146 and position the legs 62, 64 in the collapsed position. Other suitable types of locking mechanisms for retaining table legs in an extended position are disclosed in Assignee's co-pending U.S. patent application Ser. No. 10/408,949, now U.S. Pat. No. 6,971,321, entitled Table Leg Locking Mechanism, which is hereby incorporated by reference in its entirety.

Figure 15:
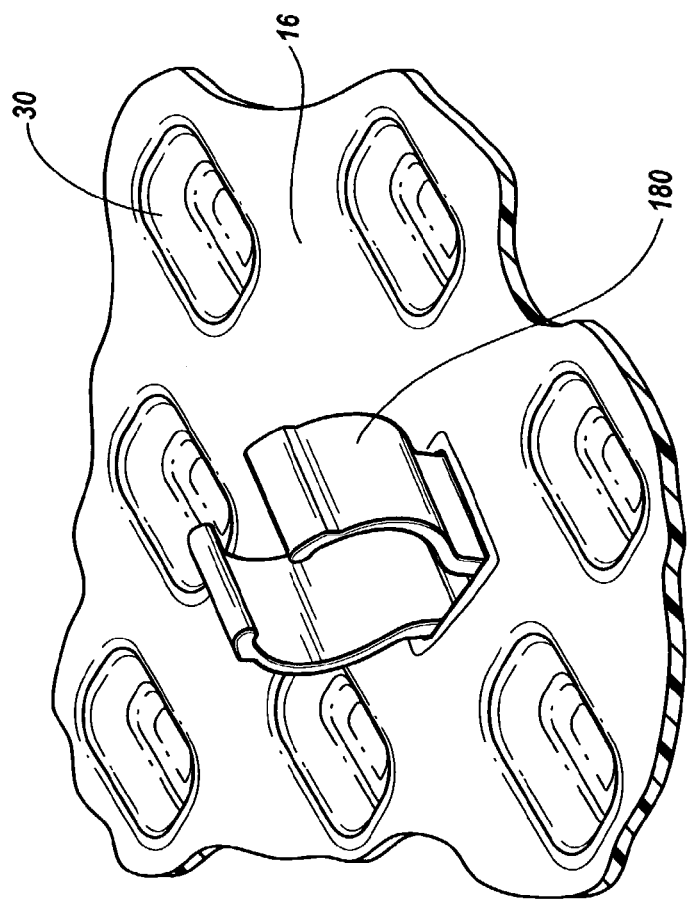
FIG. 15 is an enlarged, top perspective view of a portion of the table shown in FIG. 1, illustrating a leg receiving clip connected to the lower surface of the table top.

As shown in FIGS. 15–17, one or more clips 180 are desirably attached to the table top 12 and the clips are sized and configured to hold the legs 62, 64 in the collapsed or storage position. In particular, as seen in FIG. 3, the clips 180 receive and retain the legs 62, 64 such that the legs are generally parallel to and proximate the lower surface 16 of the table top 12. Desirably, at least a portion of the legs 62, 64 are located within the channels 72 formed in the lower surface 16 of the table top 12 so that the height of the table top can be minimized when the legs are in the collapsed position. As shown in FIG. 3, a single clip 180 may be used to receive and retain each leg 62, 64 in the collapsed position. It will be appreciated, however, that any suitable number of clips 180 may be used to retain the legs 62, 64 in the collapsed position. It will also be appreciated that the, table 10 does not require the clip 180 to secure the legs 62, 64 in the collapsed position and other suitable devices may be used to secure the legs in the collapsed position. For example, one or more securing members as disclosed in Assignee's U.S. Pat. No. 6,530,331, entitled Portable Folding Utility Table with Integral Receiving Members, which is hereby incorporated by reference in its entirety, may be used to secure the legs in the collapsed position.

The clip 180 includes a body 182 that is sized and configured to be inserted into a corresponding receiving portion 184 formed in the table top 12, and the receiving portion desirably has the same general size and shape as one of the depressions 30. Thus, while the receiving portion 184 may be placed in any suitable location, it is desirably positioned so that it does not interrupt or disturb the generally uniform pattern of depressions 30. Accordingly, the receiving portion 184 may allow the table top 12 to be constructed with generally uniform characteristics, such as generally consistent strength and structural integrity, because the receiving portion may act or function similar to one of the depressions 30.

As best seen in FIGS. 16 and 17, the clip 180 includes a leg receiving portion 186 that is sized and configured to receive and retain a leg 62, 64 of the table 10. The leg receiving portion 186 preferably receives and retains the leg 62, 64 in a snap, friction or interference fit. In particular, the leg receiving portion 186 includes an opening 188 that is smaller than the corresponding portion of the leg 62, 64 that is intended to be received by the receiving portion. Thus, when the leg 62, 64 is inserted into the opening 188, the clip 180 deforms to increase the size of the opening and allow the leg to be inserted into the leg receiving portion 186. The clip 180 then elastically or resiliently returns to its original position to receive and retain the leg 62, 64 within the leg receiving portion 186.

The clip 180 also includes a retaining portion 190 that allows the clip to be connected to the table top 12. The retaining portion 190 has a generally U-shaped configuration with opposing sidewalls 192, 194 and a lower surface 196. The opposing sidewalls 192, 194 include outwardly extending projections 198, 200, respectively, that are sized and configured to securely connect the clip 180 to the table top 12. In particular, as best seen in FIG. 17, the receiving portion 184 formed in the table top 12 includes an opening 202 that is desirably sized smaller than at least a portion of the width of the retaining portion 190 of the clip 180. When the retaining portion 190 of the clip 180 is inserted into the opening 202, the retaining portion and/or the opening deform or deflect to allow the retaining portion to be inserted into the receiving portion 184. The opening 202 and/or the retaining portion 190 then resiliently or elastically return to there original positions to secure the clip 180 within the receiving portion 184.

Additionally, the receiving portion 184 includes opposing sidewalls 204, 206 and a bottom surface 208 and at least a portion of these surfaces are intended to contact corresponding portions of the clip 180. Specifically, the sidewalls 204, 206 of the receiving portion 184 are designed to contact the sidewalls 192, 194 of the retaining portion 190 of the clip 180, and the projections 198, 200 are intended to bite into and engage the sidewalls of the receiving portion. The relatively large contact area between the retaining portion 190 of the clip 180 and the receiving portion 184 in the table top 10, and the engagement of the projections 198, 200 with the sidewalls 204, 206 of the receiving portion, allows the clip to be securely connected to the table top 12.

Advantageously, the clips 180 can be quickly and easily connected to the table top 12, which may speed the manufacturing process. The clips 180 also allow the legs 62, 64 to be secured in the collapsed position regardless of the position or orientation of the table 10. In addition, the clips 180 may be disconnected from the table top 12, if desired. Significantly, the clips 180 can be attached to the table top 12 without the use of mechanical fasteners such as screws or bolts, but mechanical fasteners may be used to attach the clips to the table top if desired. Further, it will be appreciated that the clips 180 may have other suitable sizes and configurations depending, for example, upon the size and configuration of the receiving portion 184 formed in the table top 12. Other suitable embodiments for the clip are disclosed in Assignee's co-pending U.S. patent application Ser. No. 10/409,259, entitled Table with Frame That Can Be Attached to the Table Top without Mechanical Fasteners, which was previously incorporated by reference in its entirety.

Figure 18:
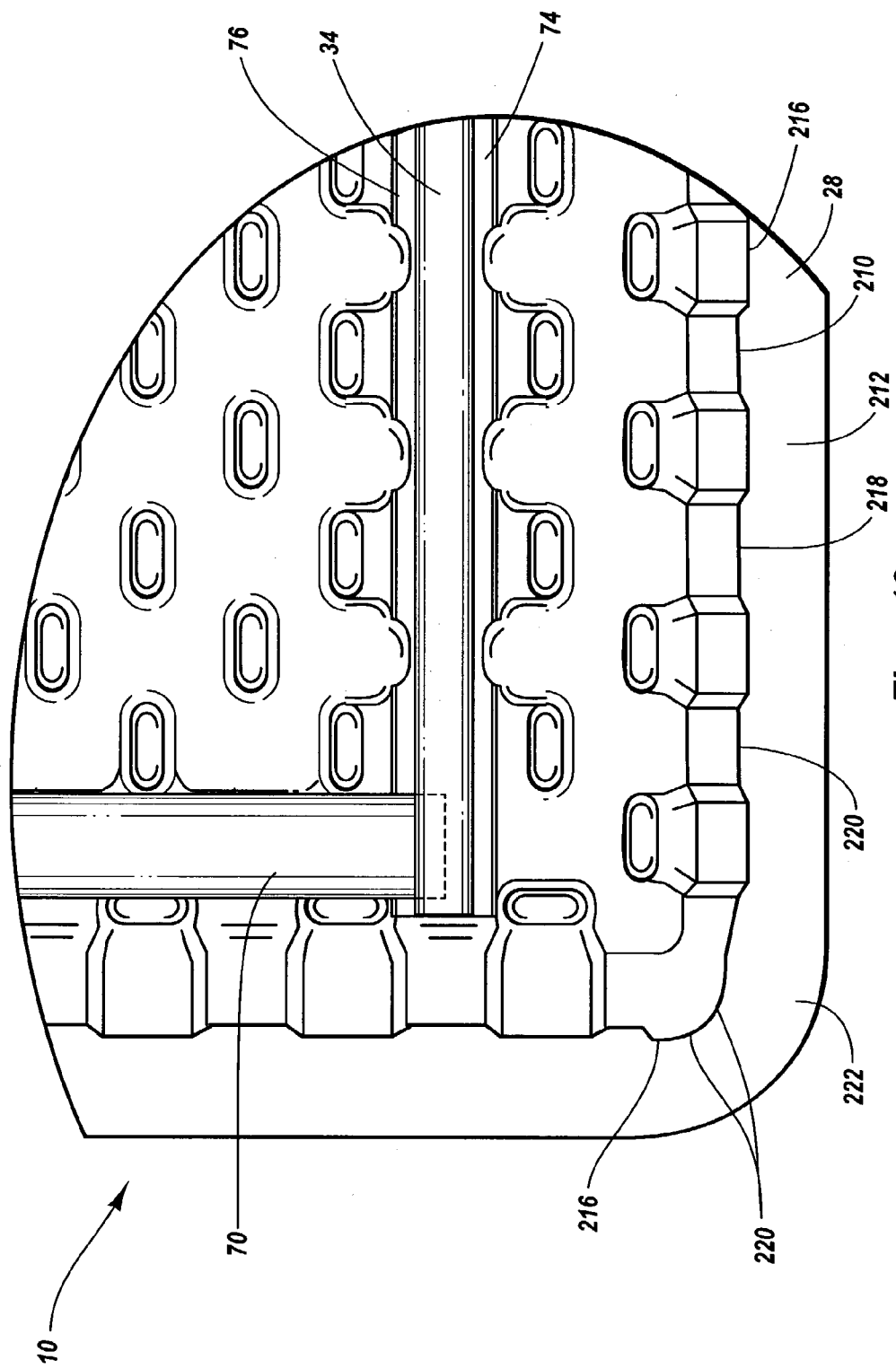
FIG. 18 is an enlarged bottom view of a portion of the table shown in FIG. 1, illustrating an inner surface of the lip and corner with one or more strengthening members.

As shown in FIGS. 2, 3 and 18, the lip 28 is preferably disposed near or at the outer portion of the table top 12. As discussed above, the lip 28 preferably extends downwardly beyond the lower surface 16 of the table top 12 and the lip may be aligned with or form part of the edge 26 of the table top, but the lip may also be spaced inwardly from the edge of the table top. As best seen in FIG. 18, the lip 28 includes an inner surface 210 and a lower surface 212, and the lip preferably has a generally hollow interior. Advantageously, the lip 28 may be integrally formed during the blow-molding process as part of a unitary, one-piece table top 12. It will be appreciated, however, that the lip 28 does not have to be formed as a unitary component of the table top 12.

The, lower surface 212 of the lip 28 desirably has a smooth, planar surface that facilitates stacking of the tables 10. The inner surface 210 of the lip 28, however, includes a number of serrations, notches, ribs, and/or struts that are sized and configured to increase the strength, rigidity and/or flexibility of the lip 28. In particular, the inner surface 210 of the lip 28 may include a number of notches, indentations, grooves or other inwardly extending portions 216 to form an uneven or saw-tooth type surface. The inner surface 210 may also include a number of bumps, humps, protrusions or other outwardly extending portions 218 to form an uneven or saw-tooth type surface. The inner surface 210 of the lip 28 may also contain a combination of inwardly and outwardly portions 216, 218 to form the uneven or saw-tooth type surface.

Advantageously, the uneven inner surfaces 210 of the lip 28 may increase the strength, rigidity and/or flexibility of the lip 28, which may increase the strength, rigidity and/or flexibility of the outer portions of the table top 12. For example, the uneven inner surfaces 210 of the lip 28 may allow the outer portions of the table top 12 to absorb more energy or larger impacts than conventional planar surfaces. Additionally, the uneven inner surfaces 210 of the lip 28 may absorb more energy without deforming and the uneven inner surfaces 210 may flex or deflect more without breaking or permanently deforming. Further, the uneven inner surfaces 210 may be more likely to resiliently return to there original configurations. Thus, the serrated inner surfaces 210 of the lip 28, may form a more durable and longer-lasting outer portion of the table top 12.

The lip 28 may also include one or more ribs 220 that increase the wall thickness of the inner surface 210 of the lip. Advantageously, the ribs 220 may also increase the strength, rigidity and/or flexibility of the outer portions of the table top 12. The ribs 220 preferably extend from the lower surface 16 of the table top 12 to the lower surface 212 of the lip 28 and the ribs are preferably generally vertically aligned, but the ribs may have any suitable arrangement and configuration. It will be appreciated that the ribs 220 may be used in combination with the inwardly extending portions 216 and/or the outwardly extending portions 218 to increase the strength of the table top 12. Further, it will be appreciated that the inwardly extending portions 216, outwardly extending portions 218 and/or ribs 220 may be located in other suitable portions of the table top 12, such as the outer surfaces of the lip, the edge 22 of the table top 12, and/or the lower surface 212 of the lip. It will be understood, however, that the table top 12 does not require inwardly extending portions 216, outwardly extending portions 218 or ribs 220 be formed in the inner surface of the lip 28.

Significantly, the inwardly extending portions 216, outwardly extending portions 218 and/or ribs 220 may be positioned such that they are generally consistent with the pattern of depressions 30 formed in the lower surface 16 of the table top 12. That is, the inwardly extending portions 216, outwardly extending portions 218 and/or ribs 220 may be located so that they are aligned with the pattern of depressions 30 to create a table top 12 with more uniform characteristics. This may allow a table top 12 to be constructed with generally consistent strength and structural integrity.

Further, as best seen in FIG. 18, one or more of the corners 222 of the table top 12 may have one or more inwardly extending portions 216, outwardly extending portions 218 and/or ribs 220 to increase the strength and structural integrity of the corner. The inwardly extending portions 216, outwardly extending portions 218 and/or ribs 220 may be spaced closer together in the corners 222 than along the inner surface 210 of the lip 28, if desired, to further increase the strength and structural integrity of the table top. The inwardly extending portions 216, outwardly extending portions 218 and/or ribs 220 may be particularly advantageous in the corners 222 because the corners may be more likely to be damaged and the curved surfaces of the corners may have less strength than the straight edges of the table top 12.

In order to further increase the strength and structural integrity of the corners 222, the radius of the corners may be increased because the strength and structural integrity of the corners increases with a larger radius of curvature. Preferably, the radius of curvature of the inner surface of the corner 222 is increased and one or more inwardly extending portions 216, outwardly extending portions 218 and/or ribs 220 are formed in the corner for added strength. It will be appreciated that the inwardly extending portions 216, outwardly extending portions 218 and/or ribs 220 may also be formed on the outer surfaces of the corners 222 and/or the other edges of the table top 12. Other suitable embodiments for a table top with inwardly extending portions, outwardly extending portions and/or ribs are disclosed in Assignee's co-pending U.S. patent application Ser. No. 10/409,273, entitled Edge and Corner for a Table Top, which is hereby incorporated by reference in its entirety.

As seen in FIGS. 2 and 3, the inner surface 210 of lip 28 may also contain one or more handles 224 that are integrally formed in the table top 12. The handles 224 allow the table 10 to be easily carried when the, legs 62, 64 are in the collapsed position. In particular, the handles 224 are preferably sized and configured to allow the user to grip the table. 10 with one hand and the handles are preferably located at or near the center of the table top 12. The handles 224 are preferably integrally formed in the lip 28 of the table top 12 so that the generally consistent pattern of depressions 30 in the lower surface 16 of the table top is not disturbed, but the handles may be formed in any desired portion of the table top. Additionally, while the handles 224 are preferably integrally formed in the table top 12 as part of a one-piece blow-molded structure, the handles do not have to be integrally formed in the table top.

Significantly, the lip 28, inwardly extending portions 216, outwardly extending portions 218, ribs 220 and handles 224 may be integrally formed in the table top 12 as part of a unitary, one-piece structure. Desirably, these features are integrally formed in the table top 12 during the blow-molding process. It will also be understood that other features of the table top 12 may be integrally formed as part of a one-piece structure. For example, the depressions 30, frame mounting portions 36, bracket mounting portions 110, and clip receiving portions 184 may be integrally formed as part of the one-piece structure. Because these features may be integrally formed in the table top 12, that may expedite the manufacturing process. These features, however, do not have to be integrally formed in the table top 12 and they could be attached to the table top by any suitable methods or devices.

Figure 19:
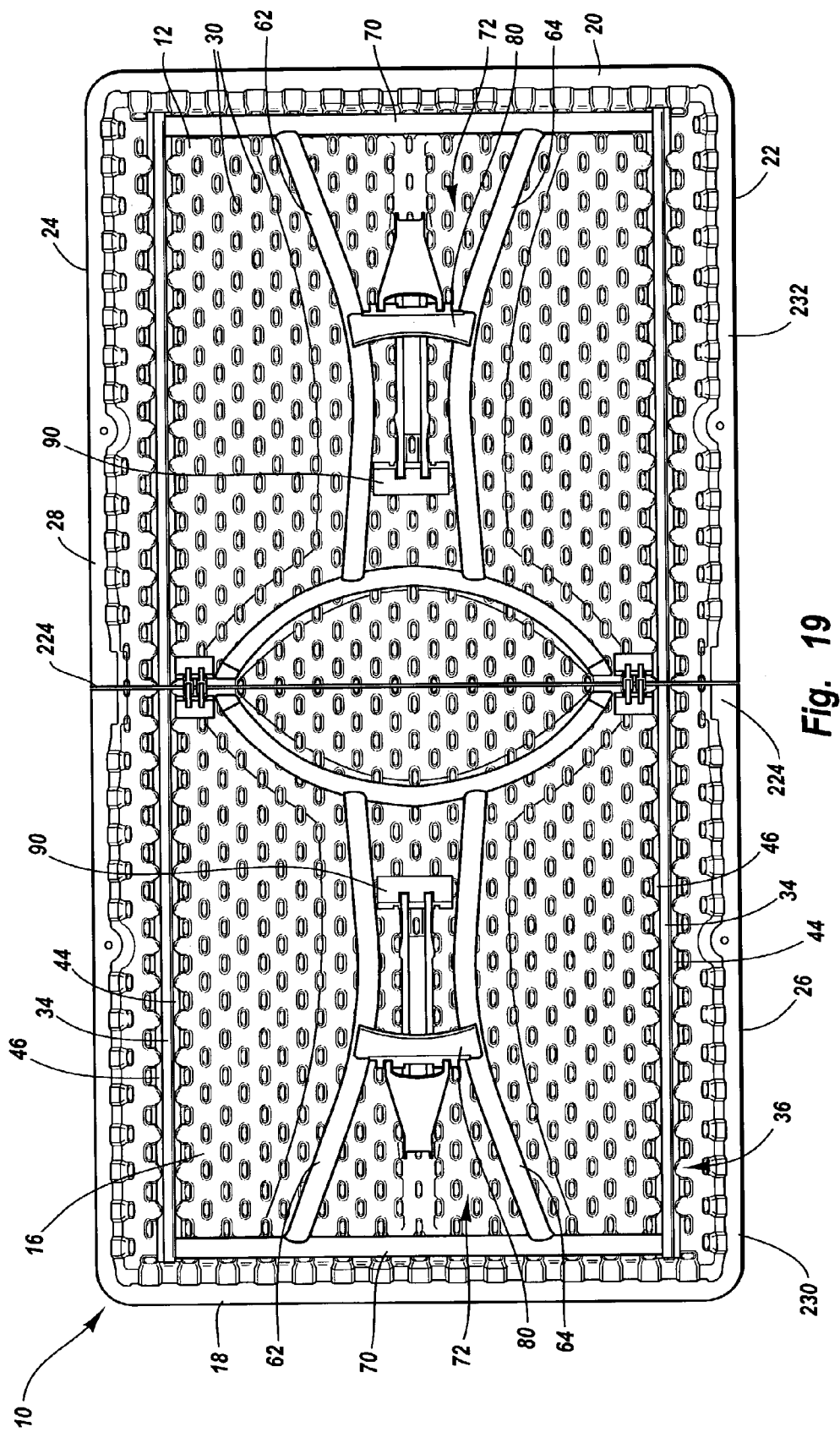
FIG. 19 is a perspective view of another embodiment of the table that can be folded in half.
Figure 20:
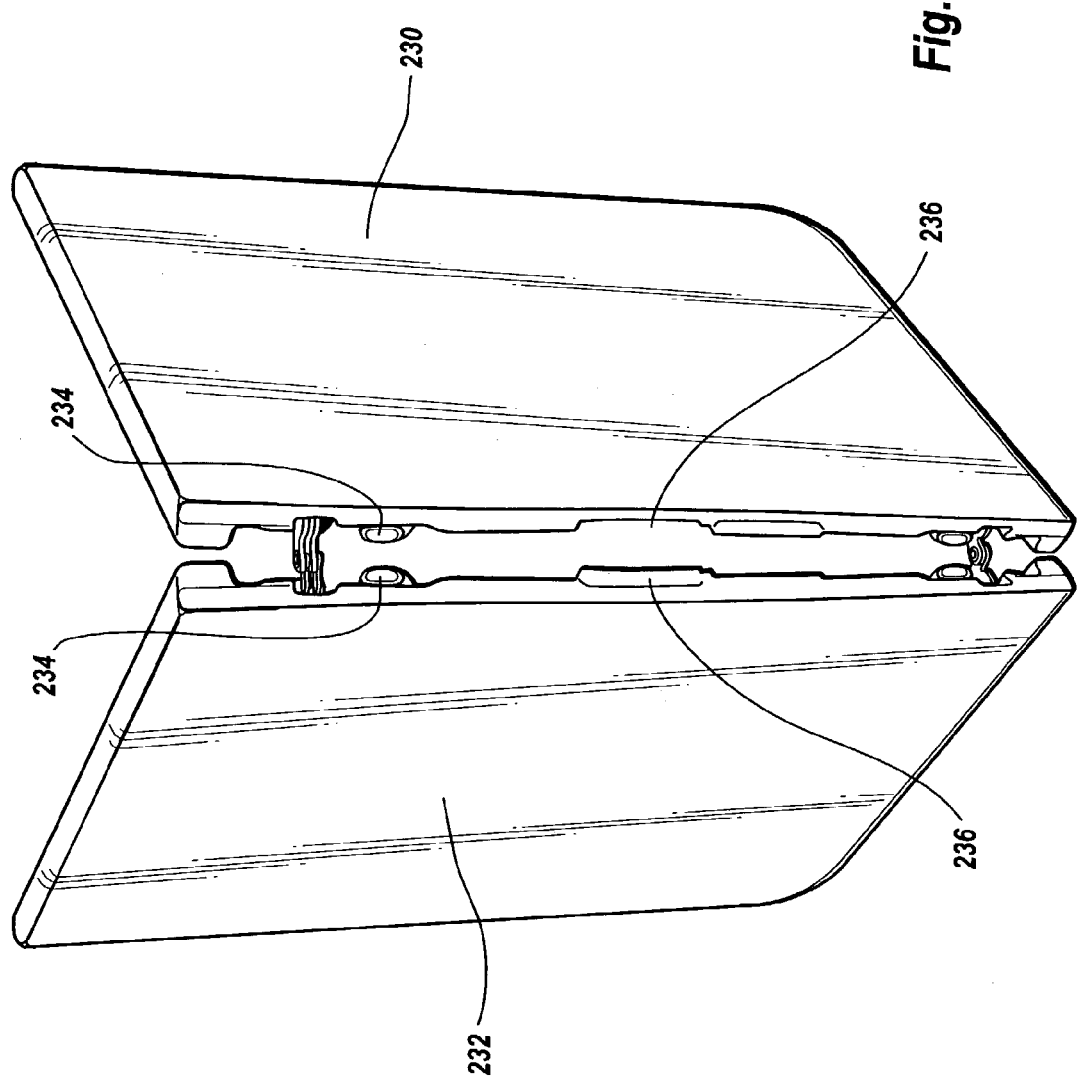
FIG. 20 is another perspective view of the table shown in FIG. 19, illustrating the table partially folded in half.

As seen in FIGS. 19 and 20, the table top 12 may also be constructed from two or more pieces. In particular, the table top 12 may be constructed from a first piece 230 and a second piece 232 with one or more interlocking portions 234 and one or more overlapping portions 236 to create the table top 12 that folds in half. Significantly, the table top 12 that folds in half may allow the table 10 to be easily transported and/or stored. Additionally, the various features discussed above can be integrally formed in the table top 12 constructed from two or more pieces. It will be appreciated, however, that the table top 12 does not have to be constructed from two or more pieces.

Although this invention has been described in terms of certain preferred embodiments, other embodiments apparent to those of ordinary skill in the art are also within the scope of this invention. Accordingly, the scope of the invention is intended to be defined only by the claims which follow.

What is claimed is:

1. A table top for a table, the table top comprising:
   a first portion of the table top constructed from blow-molded plastic and including an upper surface, an underneath portion, an inner edge and a hollow interior portion formed during the blow-molding process;
   a second portion of the table top constructed from blow-molded plastic and including an upper surface, an underneath portion, an inner edge and a hollow interior portion formed during the blow-molding process;
   a first position in which the first portion of the table top and the second portion of the table top are generally aligned and the inner edge of the first portion of the table top is disposed at least proximate the inner edge of the second portion of the table top;
   a second position in which the first portion of the table top is positioned near the second portion of the table top and the inner edge of the first portion of the table top is spaced apart from the inner edge of the second portion of the table top;
   a first interlocking portion integrally formed in the first portion of the table top as part of a unitary, one-piece structure, the first interlocking portion including an engaging portion; and
   a second interlocking portion integrally formed in the second portion of the table top as part of a unitary, one-piece structure, the second interlocking portion including a receiving portion, the first interlocking portion and the second interlocking portion being at least partially interconnected when the first portion and the second portion are in the first position, the engaging portion of the first interlocking portion being at least partially disposed in the receiving portion of the second interlocking portion when the first portion and the second portion are in the first position.

2. The table top as in claim 1, wherein the first interlocking portion has a hollow interior portion that is integrally formed with the hollow interior portion of the first portion of the table top during the blow-molding process; and
   wherein the second interlocking portion has a hollow interior portion that is integrally formed with the hollow interior portion of the second portion of the table top during the blow-molding process.

3. The table top as in claim 1, wherein at least a portion of the engaging portion of the first interlocking portion extends beyond the inner edge of the first portion of the table top; and
   wherein at least a portion of the receiving portion of the second interlocking portion does not extend beyond the inner edge of the second portion of the table top.

4. The table top as in claim 1, further comprising a first overlapping portion integrally formed in the first portion of the table top as part of a unitary, one-piece structure and a second overlapping portion integrally formed in the second portion of the table top as part of a unitary, one-piece structure, the first overlapping portion and the second overlapping portion being at least partially interconnected when the first portion and the second portion are in the first position.

5. The table top as in claim 4, wherein the first overlapping portion has a hollow interior portion that is integrally formed with the hollow interior portion of the first portion of the table top during the blow-molding process; and
   wherein the second overlapping portion has a hollow interior portion that is integrally formed with the hollow interior portion of the second portion of the table top during the blow-molding process.

6. The table top as in claim 1, wherein the first interlocking portion includes a first overlapping portion and the second interlocking portion includes a second overlapping portion, the first overlapping portion and the second overlapping portion being at least partially interconnected when the first portion and the second portion are in the first position.

7. A table top for a table, the table top comprising:
   a first portion of the table top constructed from blow-molded plastic and including an upper surface, an underneath portion, an inner edge and a hollow interior portion formed during the blow-molding process;
   a second portion of the table top constructed from blow-molded plastic and including an upper surface, an underneath portion, an inner edge and a hollow interior portion formed during the blow-molding process;
   a first position in which the first portion of the table top and the second portion of the table top are generally aligned and the inner edge of the first portion of the table top is disposed at least proximate the inner edge of the second portion of the table top;
   a second position in which the first portion of the table top is positioned near the second portion of the table top and the inner edge of the first portion of the table top is spaced apart from the inner edge of the second portion of the table top;
   a first overlapping portion integrally formed in the first portion of the table top as part of a unitary, one-piece structure, the first overlapping portion including an engaging portion; and
   a second overlapping portion integrally formed in the second portion of the table top as part of a unitary, one-piece structure, the second overlapping portion including an engaging portion, the first overlapping portion and the second overlapping portion being at least partially overlapping when the first portion and the second portion are in the first position, the engaging portion of the first overlapping portion at least partially engaging in the engaging portion of the second overlapping portion when the first portion and the second portion are in the first position.

8. The table top as in claim 7, wherein the first overlapping portion has a hollow interior portion that is integrally formed with the hollow interior portion of the first portion of the table top during the blow-molding process; and
   wherein the second overlapping portion has a hollow interior portion that is integrally formed with the hollow interior portion of the second portion of the table top during the blow-molding process.

9. The table top as in claim 7, wherein at least a portion of the engaging portion of the first overlapping portion extends beyond the inner edge of the first portion of the table top; and
   wherein at least a portion of the engaging portion of the second overlapping portion extends beyond the inner edge of the second portion of the table top.

10. The table top as in claim 7, further comprising a first interlocking portion integrally formed in the first portion of the table top as part of a unitary, one-piece structure and a second interlocking portion integrally formed in the second portion of the table top as part of a unitary, one-piece structure, the first interlocking portion and the second interlocking portion being at least partially interconnected when the first portion and the second portion are in the first position.

11. The table top as in claim 10, wherein the first interlocking portion has a hollow interior portion that is integrally formed with the hollow interior portion of the first portion of the table top during the blow-molding process; and wherein the second interlocking portion has a hollow interior portion that is integrally formed with the hollow interior portion of the second portion of the table top during the blow-molding process.

12. The table top as in claim 7, wherein the first overlapping portion includes a first interlocking portion and the second overlapping portion includes a second interlocking portion, the first interlocking portion and the second interlocking portion being at least partially interconnected when the first portion and the second portion are in the first position.

13. A table top comprising:
a first section of the table top that is constructed from blow-molded plastic and includes an upper portion, a lower portion, an inner edge and a hollow interior portion formed during the blow-molding process;
an engaging portion that is integrally formed with the first section of the table top as part of a unitary, one-piece structure during the blow-molding process, at least a portion of the engaging portion extending beyond the inner edge of the first section of the table top;
a second section of the table top that is constructed from blow-molded plastic and includes an upper portion, a lower portion, an inner edge and a hollow interior portion formed during the blow-molding process; and
a receiving portion that is integrally formed with the second section of the table top as part of a unitary, one-piece structure during the blow-molding process, the receiving portion being sized and configured to receive at least a portion of the engaging portion;
wherein the first section and the second section of the table top are capable of being moved between a first position in which the upper portion of the first section and the upper portion of the second section are generally aligned and a second position in which the first section and the second section are disposed proximate to each other;
wherein the engaging portion is at least partially disposed within the receiving portion when the first section and the second section are in the first position and the engaging portion is spaced apart from the receiving portion when the first section and the second section are in the second position.

14. The table top as in claim 13, wherein the engaging portion and the receiving portion at least partially overlap when the first section and the second section of the table top are in the first position.

15. The table top as in claim 13, wherein the engaging portion and the receiving portion at least partially interlock when the first section and the second section are in the first position.

16. The table top as in claim 13, further comprising:
an engaging portion that is integrally formed with the second section of the table top as part of a unitary, one-piece structure during the blow-molding process; and
a receiving portion that is integrally formed with the first section of the table top as part of a unitary, one-piece structure during the blow-molding process, the receiving portion being sized and configured to receive at least a portion of the engaging portion;
wherein the engaging portion of the second section of the table top is at least partially disposed within the receiving portion in the first section of the table top when the first section and the second section are in the first position; and
wherein the engaging portion of the second section of the table top is spaced apart from the receiving portion in the first section of the table top when the first section and the second section are in the second position.

17. The table top as in claim 13, further comprising a second engaging portion that is integrally formed with the first section of the table top as part of a unitary, one-piece structure during the blow-molding process, at least a portion of the second engaging portion extending beyond the inner edge of the first section of the table top; and
a second receiving portion that is integrally formed with the second section of the table top as part of a unitary, one-piece structure during the blow-molding process, the second receiving portion being sized and configured to receive at least a portion of the second engaging portion;
wherein the second engaging portion is at least partially disposed within the second receiving portion when the first section and the second section are in the first position; and
wherein the second engaging portion is spaced apart from the second receiving portion when the first section and the second section are in the second position.

18. The table top as in claim 13, wherein the engaging portion includes an outwardly extending flange and the receiving portion includes a recess.

19. The table top as in claim 13, wherein the engaging portion includes a hollow interior portion that is integrally formed with the hollow interior portion of the first portion of the table top during the blow-molding process.

20. The table top as in claim 13, wherein the engaging portion and the receiving portion are sized and configured to help support the table top when the first section and the second section of the table top are in the first position.

* * * * *

UNITED STATES PATENT AND TRADEMARK OFFICE
CERTIFICATE OF CORRECTION

PATENT NO. : 7,096,799 B2
APPLICATION NO. : 10/408914
DATED : August 29, 2006
INVENTOR(S) : Strong et al.

It is certified that error appears in the above-identified patent and that said Letters Patent is hereby corrected as shown below:

Column 6
Line 26, change "use tools" to --use of tools--
Line 41, change "allow, the" to --allow the--

Column 9
Line 27, change "to rounded" to --to be rounded--
Line 41, change "that" to --than--
Line 53, change "plastic and" to --plastic, and--

Column 12
Line 47, change "there" to --their--

Column 13
Line 28, change "100" to --10--
Line 46, change "frame. 32" to --frame 32--
Line 49, change "44,46" to --44, 46--

Column 14
Line 5, change "example, the" to --example, on the--

Column 17
Line 3, change "that" to --the--
Line 66, change "1166" to --116--

Column 18
Line 9, change "100" to --110--
Line 58, change "there" to --their--

Column 19
Line 9, change "into, the" to --into the--
Line 52, change "that" to --the--

Column 22
Line 43, change "140" to --142--

Column 23
Line 6, change "not" to --no--
Line 29, change "the," to --the--

UNITED STATES PATENT AND TRADEMARK OFFICE
CERTIFICATE OF CORRECTION

PATENT NO. : 7,096,799 B2
APPLICATION NO. : 10/408914
DATED : August 29, 2006
INVENTOR(S) : Strong et al.

It is certified that error appears in the above-identified patent and that said Letters Patent is hereby corrected as shown below:

Column 24
Line 14, change "there" to --their--
Line 60, change "The," to --The--

Column 25
Line 19, change "there" to --their--
Line 38, change "22" to --26--

Column 26
Line 21, change "the," to --the--
Line 24, change "table. 10" to --table 10--

Signed and Sealed this

Thirteenth Day of March, 2007

JON W. DUDAS
*Director of the United States Patent and Trademark Office*